(12) United States Patent
Yamanaka

(10) Patent No.: US 8,320,715 B2
(45) Date of Patent: Nov. 27, 2012

(54) DEVICE AND METHOD FOR INTERPOLATING IMAGE, AND IMAGE SCANNER

(75) Inventor: Satoshi Yamanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 539 days.

(21) Appl. No.: 12/666,750

(22) PCT Filed: Feb. 8, 2008

(86) PCT No.: PCT/JP2008/052143
§ 371 (c)(1),
(2), (4) Date: Dec. 24, 2009

(87) PCT Pub. No.: WO2009/001575
PCT Pub. Date: Dec. 31, 2008

(65) Prior Publication Data
US 2010/0183237 A1    Jul. 22, 2010

(30) Foreign Application Priority Data
Jun. 25, 2007   (JP) ................................ 2007-165860

(51) Int. Cl.
*G06K 9/32*   (2006.01)
*G06K 9/40*   (2006.01)
(52) U.S. Cl. ........................................ 382/300; 382/264
(58) Field of Classification Search .................... 382/300
See application file for complete search history.

(56) References Cited

U.S. PATENT DOCUMENTS

| | | | |
|---|---|---|---|
| 6,765,587 B1 * | 7/2004 | Zhang et al. ................... | 345/606 |
| 7,692,670 B2 * | 4/2010 | Case ............................... | 345/648 |
| 7,826,686 B2 * | 11/2010 | Miyashita et al. ............. | 382/300 |
| 2006/0050990 A1 | 3/2006 | Yamanaka et al. | |
| 2006/0152597 A1 * | 7/2006 | Shimizu ...................... | 348/222.1 |
| 2007/0003167 A1 * | 1/2007 | Ferretti et al. ................ | 382/300 |
| 2007/0092156 A1 | 4/2007 | Yamanaka et al. | |

FOREIGN PATENT DOCUMENTS

| | | |
|---|---|---|
| CN | 1723690 A | 1/2006 |
| CN | 1879126 A | 12/2006 |
| EP | 1 720 337 A1 | 11/2006 |
| JP | 62-296667 A | 12/1987 |
| JP | 11-205687 A | 7/1999 |
| JP | 2000-196835 A | 7/2000 |
| JP | 2003-101724 A | 4/2003 |
| JP | 2005-117291 A | 4/2005 |
| JP | 2005-141611 A | 6/2005 |
| JP | 2005-236770 A | 9/2005 |
| TW | I235603 B | 7/2005 |

* cited by examiner

*Primary Examiner* — Anand Bhatnagar
*Assistant Examiner* — Soo Park
(74) *Attorney, Agent, or Firm* — Birch, Stewart, Kolasch & Birch, LLP

(57) ABSTRACT

An image interpolation device comprises a data storage unit (2) for storing the data in the neighborhood of a missing pixel, a filter interpolation unit (3) for performing a multiply-add computation on the data output from the data storage unit, a limiter processing unit (4) for limiting the data output from the filter interpolation unit to within the range of the data output from the data storage unit, and an interpolation data insertion unit (5) for interpolating the data output from the limiter processing unit into a position corresponding to the missing pixel in the data output from the data storage unit. The image interpolation device is capable of increasing the interpolation accuracy of missing pixels, especially in the interpolation of scanned document data including periodic data.

9 Claims, 21 Drawing Sheets

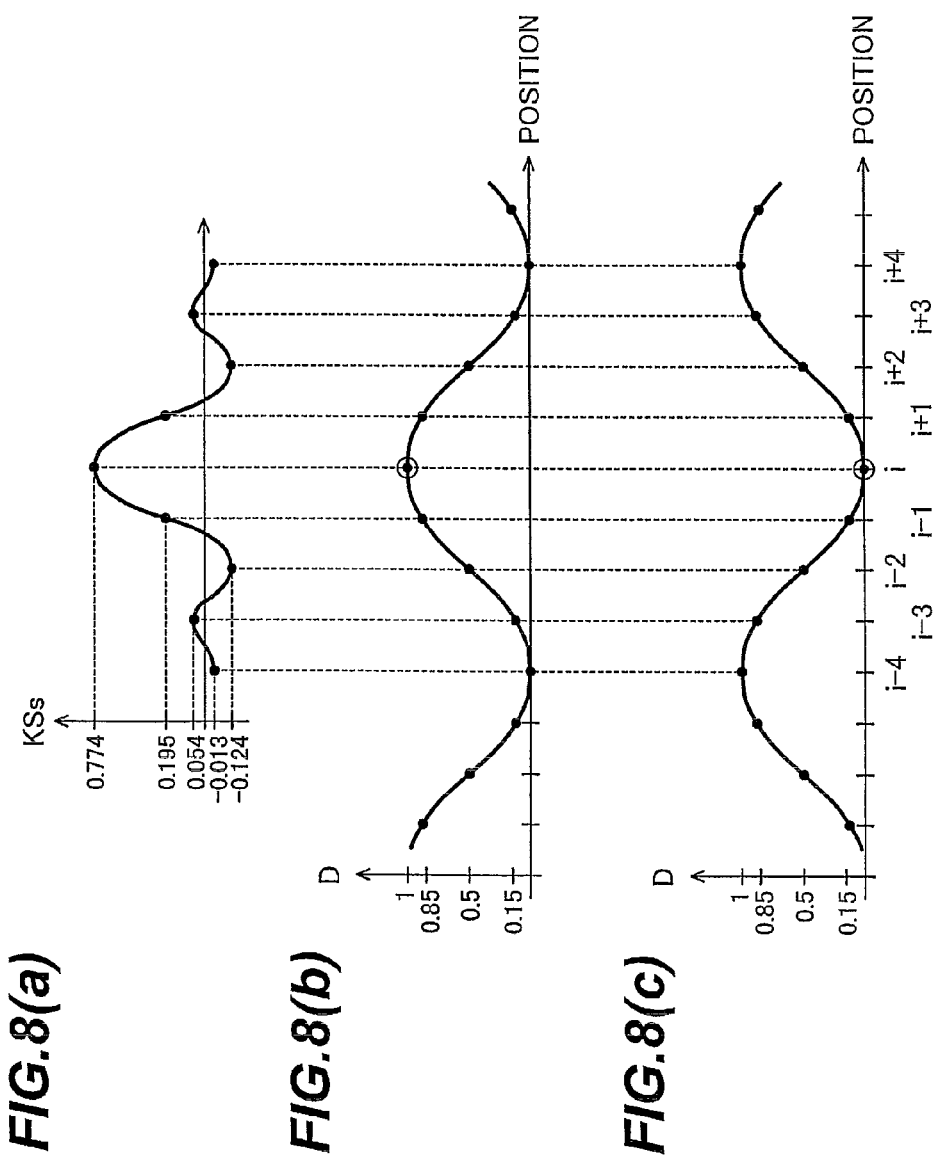

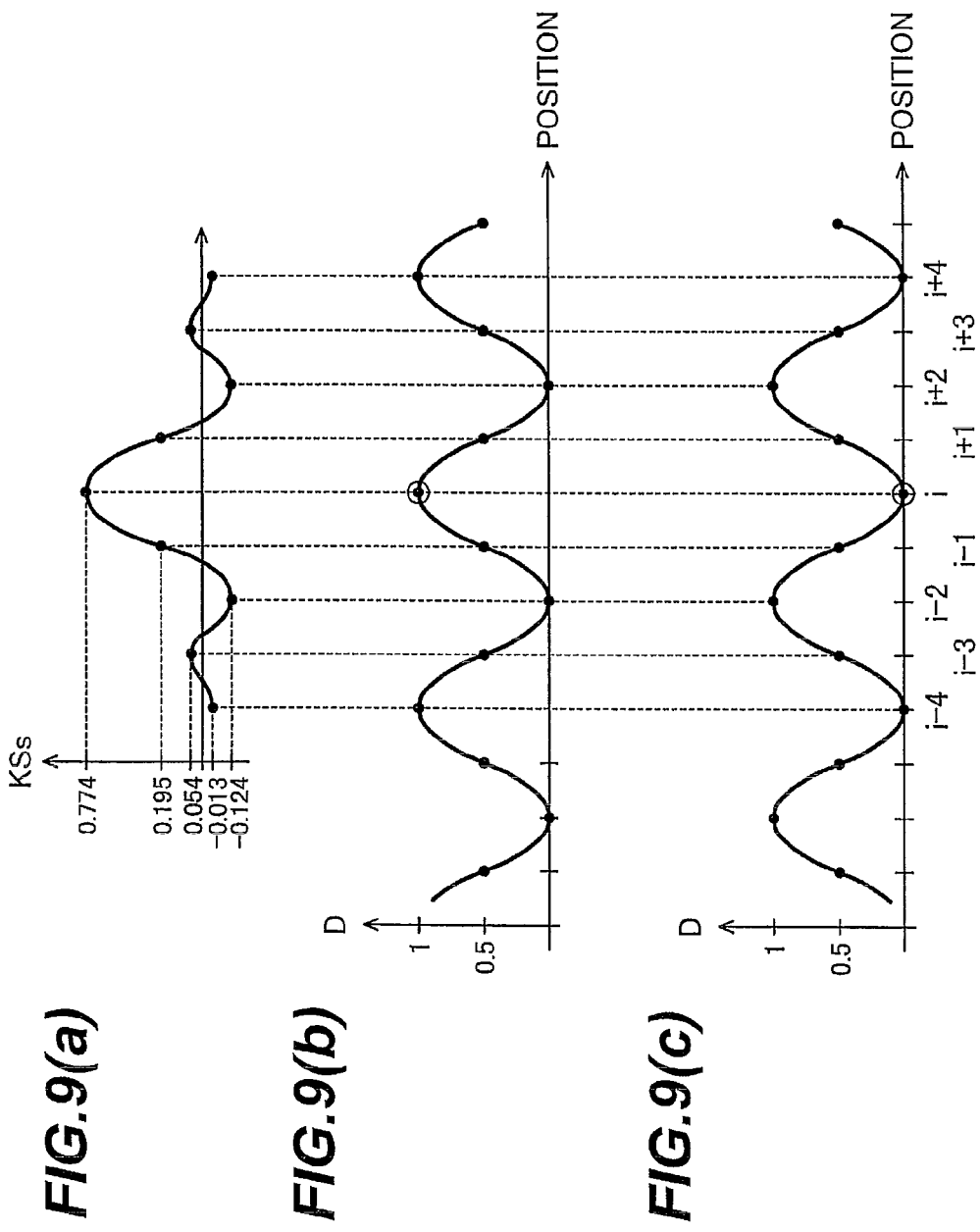

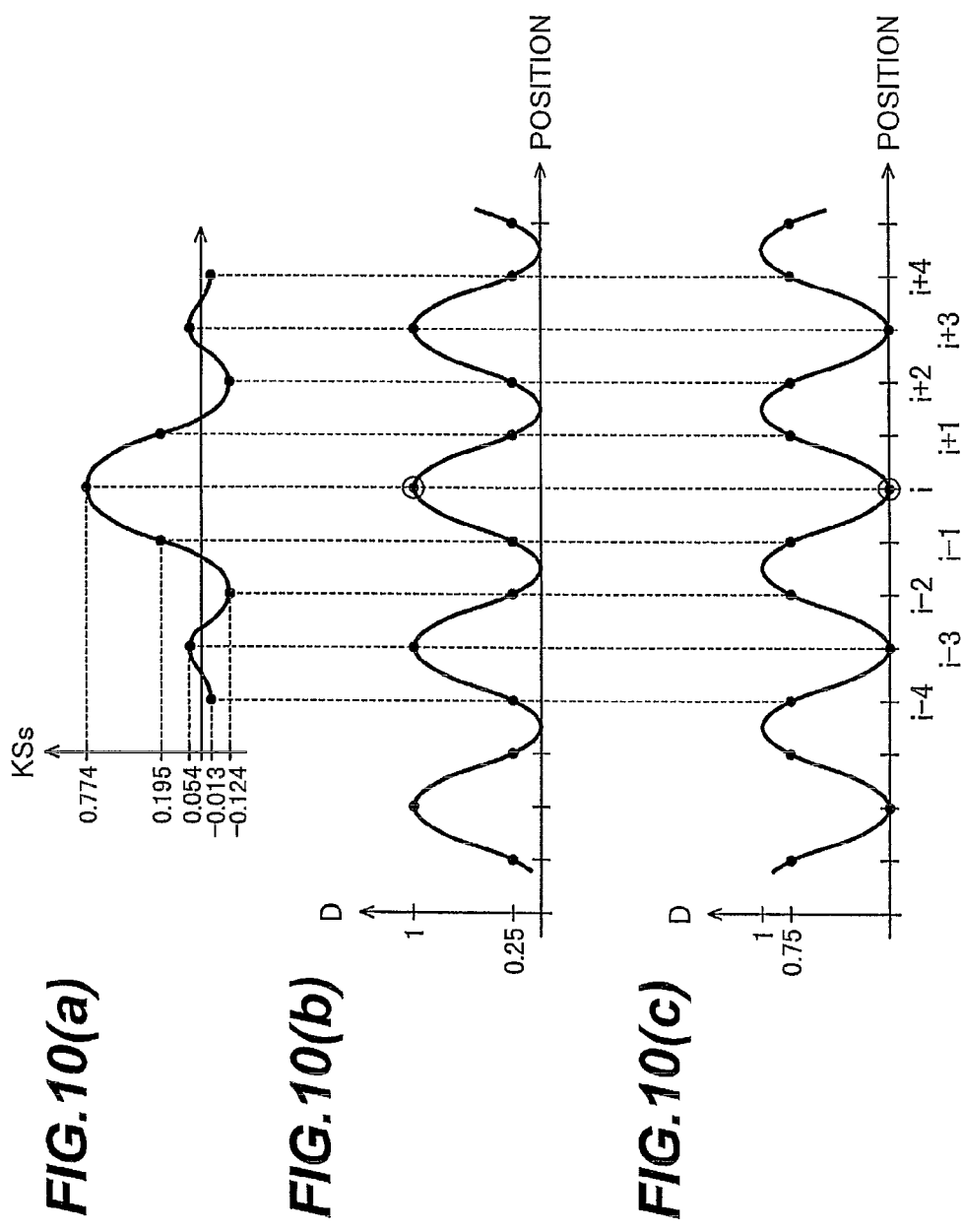

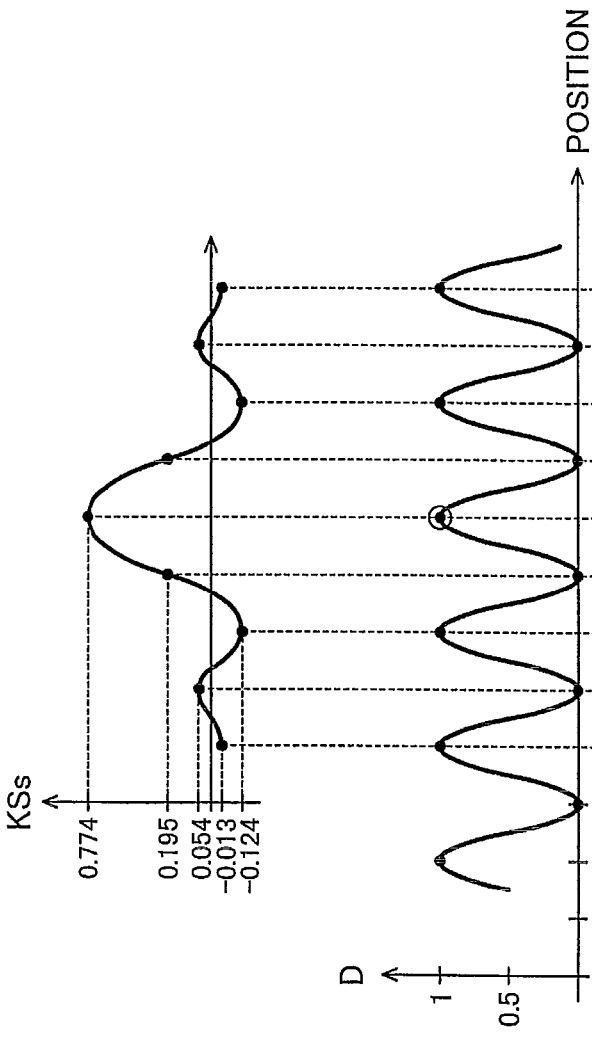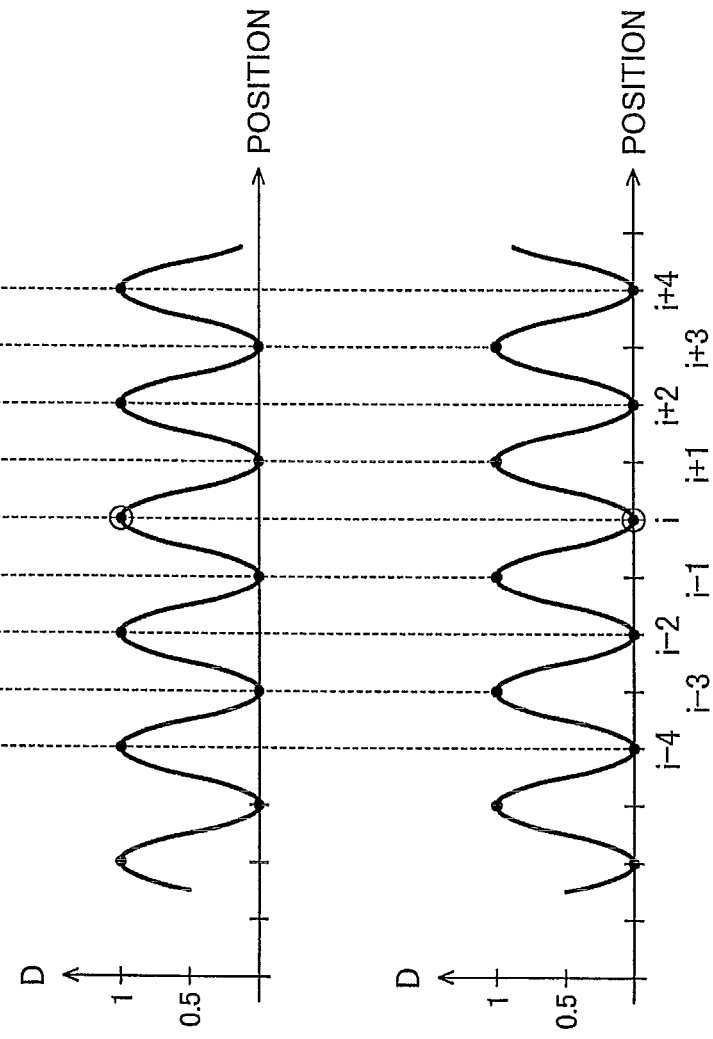
FIG.11(a)
FIG.11(b)
FIG.11(c)

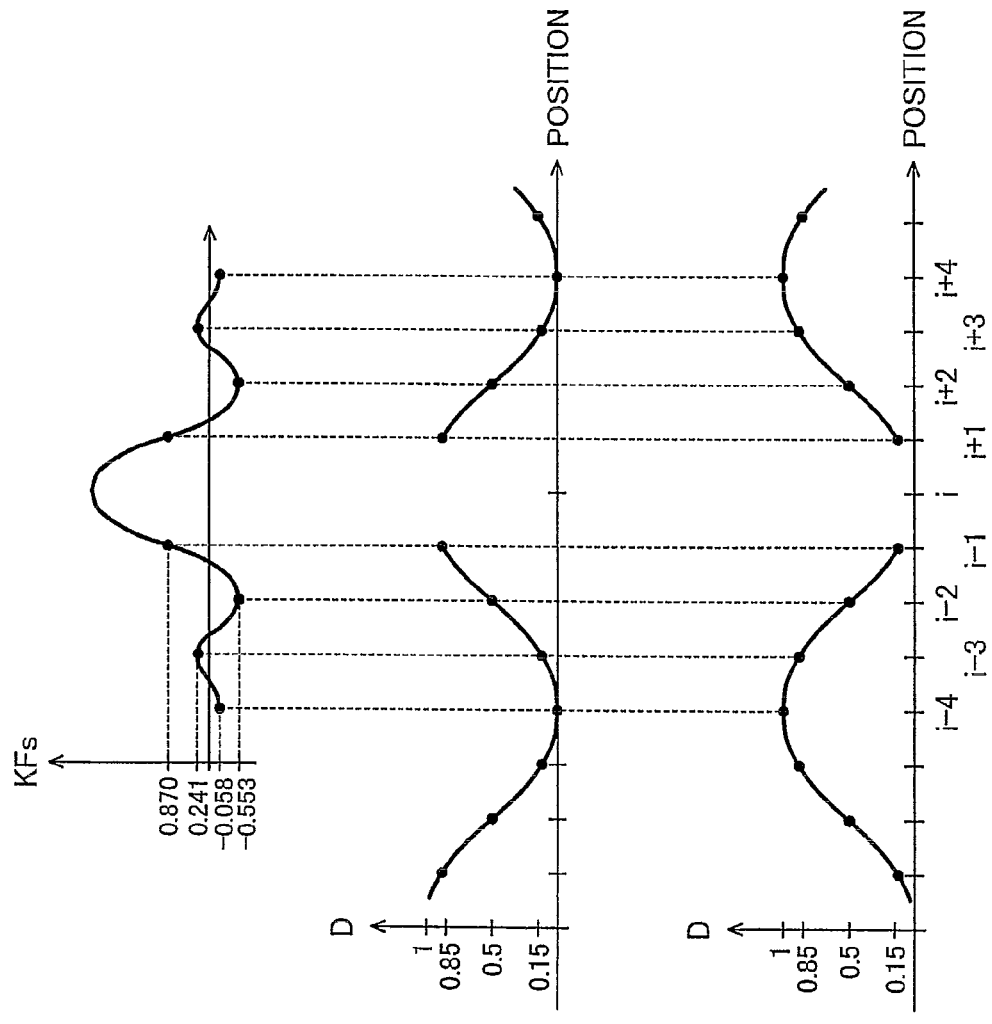

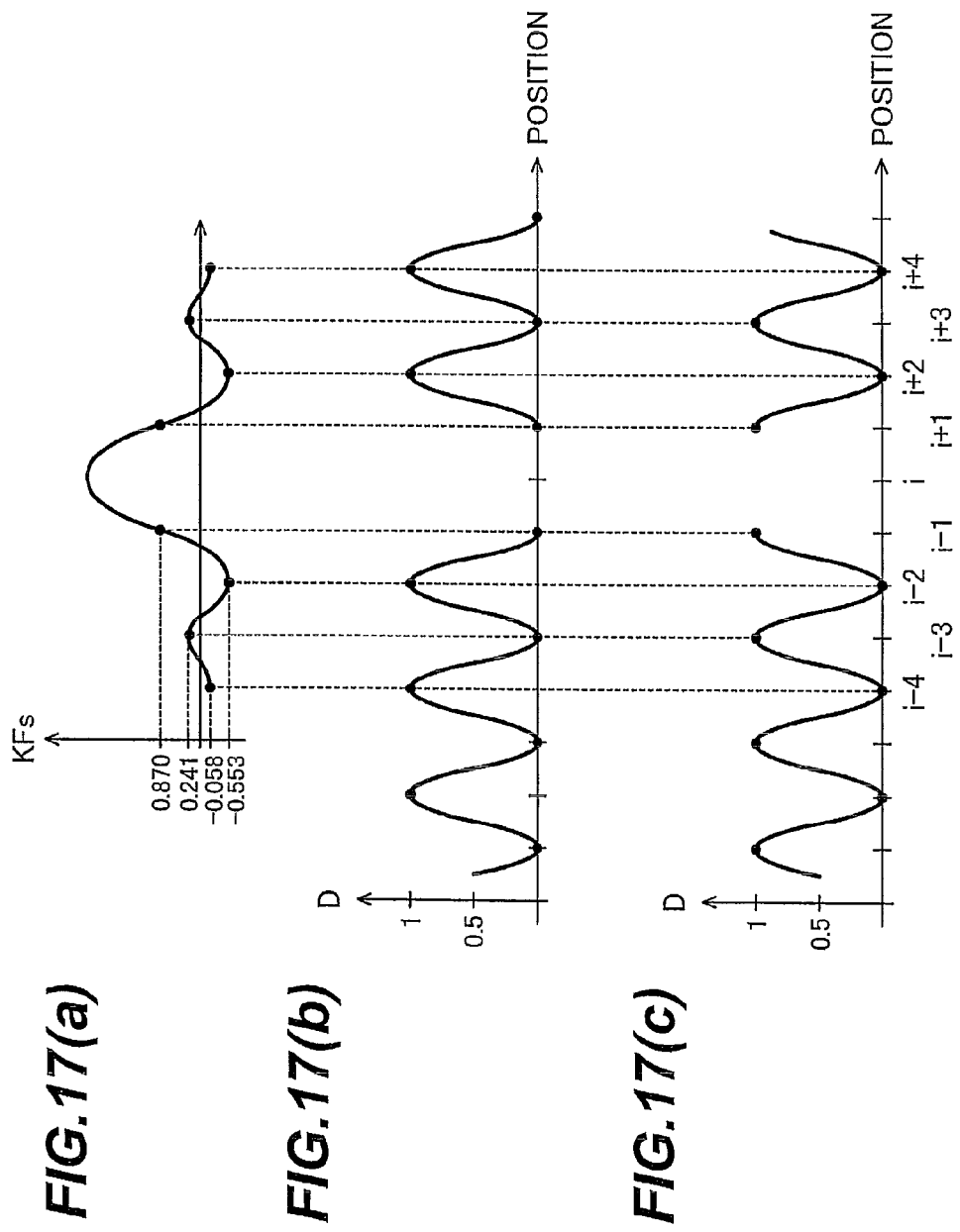

|  | $T_1$ | $T_2$ | ...... | $T_m$ | TOTAL DATA |
|---|---|---|---|---|---|
| FILTER INTERPOLATION UNIT | M0[$T_1$] | M0[$T_2$] | ...... | M0[$T_m$] | S0 |
| FIRST MEAN PRESERVING INTERPOLATOR | M1[$T_1$] | M1[$T_2$] | ...... | M1[$T_m$] | S1 |
| SECOND MEAN PRESERVING INTERPOLATOR | M2[$T_1$] | M2[$T_2$] | ...... | M2[$T_m$] | S2 |
| ⋮ | ⋮ | ⋮ | ⋮ | ⋮ |  |
| n-TH MEAN PRESERVING INTERPOLATOR | Mn[$T_1$] | Mn[$T_2$] | ...... | Mn[$T_m$] | Sn |

FIG.28
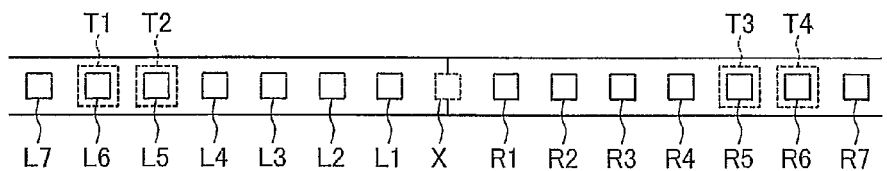
FIG.29
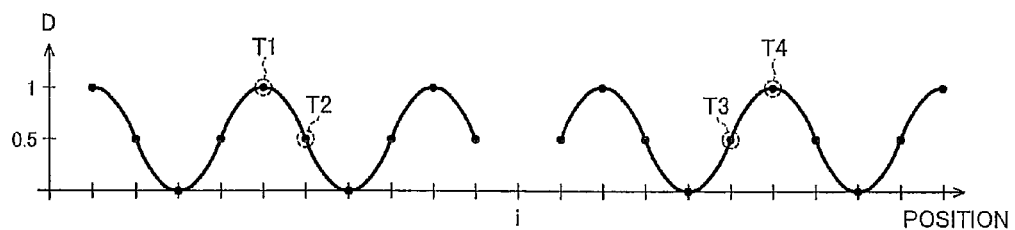
FIG.30
|  | $T_1$ | $T_2$ | $T_3$ | $T_4$ | TOTAL DATA |
|---|---|---|---|---|---|
| FILTER INTERPOLATION UNIT | 0.005 | 0 | 0 | 0.005 | 0.01 |
| FIRST MEAN PRESERVING INTERPOLATOR | 1 | 0.5 | 0.5 | 1 | 3 |
| SECOND MEAN PRESERVING INTERPOLATOR | 1 | 0 | 0 | 1 | 2 |
FIG.31
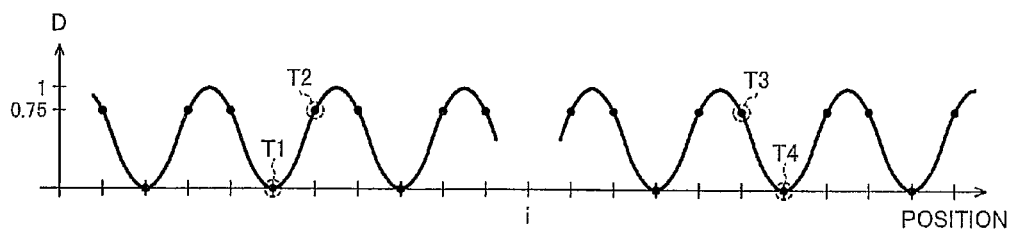

|  | $T_1$ | $T_2$ | $T_3$ | $T_4$ | TOTAL DATA |
|---|---|---|---|---|---|
| FILTER INTERPOLATION UNIT | 0.3885 | 0.19425 | 0.19425 | 0.3885 | 1.1655 |
| FIRST MEAN PRESERVING INTERPOLATOR | 0.75 | 0.75 | 0 | 0.75 | 2.25 |
| SECOND MEAN PRESERVING INTERPOLATOR | 0 | 0 | 0 | 0 | 0 |

|  | $T_1$ | $T_2$ | $T_3$ | $T_4$ | TOTAL DATA |
|---|---|---|---|---|---|
| FILTER INTERPOLATION UNIT | 2.222 | 2.222 | 2.222 | 2.222 | 8.888 |
| FIRST MEAN PRESERVING INTERPOLATOR | 0 | 0 | 0 | 0 | 0 |
| SECOND MEAN PRESERVING INTERPOLATOR | 0 | 0 | 0 | 0 | 0 |

# DEVICE AND METHOD FOR INTERPOLATING IMAGE, AND IMAGE SCANNER

TECHNICAL FIELD

This invention relates to an image interpolation device for interpolating pixels if for some reason an image drop-out occurs when a document is digitally scanned by use of a scanner, facsimile machine, camera, or the like; more particularly, the invention relates to an image interpolation device and method that can be used to interpolate pixels at the boundaries between sensor ICs in a contact image sensor having a plurality of IC sensor chips arrayed in a straight line, each sensor IC chip having a plurality of imaging elements arrayed in a straight line.

BACKGROUND ART

Methods employed in conventional pixel interpolation devices used in the above situations to calculate interpolation data for missing pixels include a method in which the mean of the values of the pixels adjacent to a missing pixel is used as the interpolation data, a method in which a regression line is found for the pixels adjacent to a missing pixel by use of the least squares method and the interpolation data are calculated from the regression line, and a method in which a quartic curve is found from the four pixels adjacent to a missing pixel and the interpolation data are calculated from its quartic equation (see, for example, Patent Document 1), but it is difficult for these devices to interpolate periodic data.

As an improvement, the interpolation of periodic data by determining interpolation data for a missing pixel such that the mean value of a plurality of pixels including the missing pixel becomes equal to the mean value of a plurality of pixels excluding the missing pixel has been proposed (see, for example, Patent Document 2). A further proposal is adaptive switching of the interpolation method by providing a plurality of interpolation circuits with differing characteristics, a marking circuit, a management circuit, and an output circuit, wherein each of the plurality of interpolation circuits generates interpolation data for the missing pixel and pixels in the vicinity of the mixing pixel, the marking circuit generates marking data based on the interpolation data respectively output by the plurality of interpolation circuits for the pixels in the vicinity of the mixing pixel and the corresponding original data of the pixels in the vicinity of the mixing pixel, the management circuit generates a selection signal for selecting one from among the interpolation data for the missing pixel output by the plurality of interpolation circuits, based on the marking data output by the marking circuit, and the output circuit outputs, as the missing pixel data, the selected one from among the interpolation data for the missing pixel output by the plurality of interpolation circuits, based on the selection signal output from the management circuit (see, for example, Patent Document 3).

Patent Document 1: Japanese Patent Application Publication No. 2003-101724 (pp. 5-6, FIGS. 3-5)
Patent Document 2: Japanese Patent Application Publication No. 2005-141611 (pp. 3-7, FIG. 1)
Patent Document 3: Japanese Patent Application Publication No. 2005-117291 (pp. 7-8, FIG. 1)

DISCLOSURE OF THE INVENTION

Problems to be Solved by the Invention

The above prior art, however, was sometimes insufficiently accurate in interpolating missing pixels, particularly when interpolating data scanned from a document including periodic data.

Means of Solution of the Problems

This invention addresses the above problem; the image interpolation device of the invention includes:
a data storage unit for storing a plurality of pixel value data;
a filter interpolation unit for receiving data read from the data storage unit and performing a multiply-add operation by, from among the plurality of pixels arrayed in a line, multiplying the values of a plurality of neighboring pixels located in a neighborhood of a missing pixel by predetermined coefficients and adding resulting products, thereby calculating an interpolated value for the missing pixel;
a limit processing unit for limiting the data output from the filter interpolation unit to within a range of values of the data in the neighborhood of the missing pixel; and
an interpolation data insertion unit for inserting the data output from the limit processing unit into a position corresponding to the missing pixel in the data output from the data storage unit.

Effect Of The Invention

This invention employs an interpolation method with an improved low-pass filter having a high cutoff frequency, and accordingly pixels in periodic data with frequencies lower than the cutoff frequency can be interpolated properly.

BRIEF DESCRIPTION OF THE DRAWINGS

FIGS. 8(a) to 8(c) are drawings illustrating the relationships between data and the coefficients by which the data are multiplied when the pixel at the i-th position in data with an eight-pixel period is processed (filtered) using the low-pass filter in FIG. 7.
FIGS. 9(a) to 9(c) are drawings illustrating the relationships between data and the coefficients by which the data are multiplied when the pixel at the i-th position in data with a four-pixel period is processed (filtered) using the low-pass filter in FIG. 7.

FIGS. 10(a) to 10(c) are drawings illustrating the relationships between data and the coefficients by which the data are multiplied when the pixel at the i-th position in data with a three-pixel period is processed (filtered) using the low-pass filter in FIG. 7.

FIGS. 11(a) to 11(c) are drawings illustrating the relationships between data and the coefficients by which the data are multiplied when the pixel at the i-th position in data with a two-pixel period is processed (filtered) using the low-pass filter in FIG. 7.

FIGS. 14(a) to 14(c) are drawings illustrating the relationships between data and the coefficients by which the data are multiplied when the pixel i at a boundary in data with an eight-pixel period is interpolated using the low-pass interpolation filter in FIG. 13.

FIGS. 17(a) to 17(c) are drawings illustrating the relationships between data and the coefficients by which the data are multiplied when the pixel i at a boundary in data with a two-pixel period is interpolated using the low-pass interpolation filter in FIG. 13.

FIG. 28 is a drawing showing positional relationships of test interpolation pixels and the missing pixel in a specific example.

FIG. 29 is a drawing showing data with a four-pixel period, into which a pixel is interpolated at position i.

FIG. 30 is a table of the marking data output by the marking unit and the score data managed by the management unit.

FIG. 31 is a drawing showing data with a three-pixel period, into which a pixel is interpolated at position i.

EXPLANATION OF REFERENCE CHARACTERS

1 image interpolation device, 2 data storage unit, 3 filter interpolation unit, 4 limit processing unit, 5 interpolation data insertion unit, 6 multiply-add unit, 7 coefficient storage unit, 8 contact image sensor, 9 light source, 10 sensor chip row, 11 A/D converter, 12 document, 13-1 to 13-k sensor chips, 14-1 to 14-m light receiving elements in the sensor chip at the left end, 15-1 a light receiving element at the left end of the second sensor chip from the left, 16-m a light receiving element at the right end of the sensor chip at the right end, 17-1 to 17-n mean preserving interpolators, 18 marking unit, 19 management unit, 20 output unit.

BEST MODE FOR CARRYING OUT THE INVENTION

First Embodiment

Figure 1:
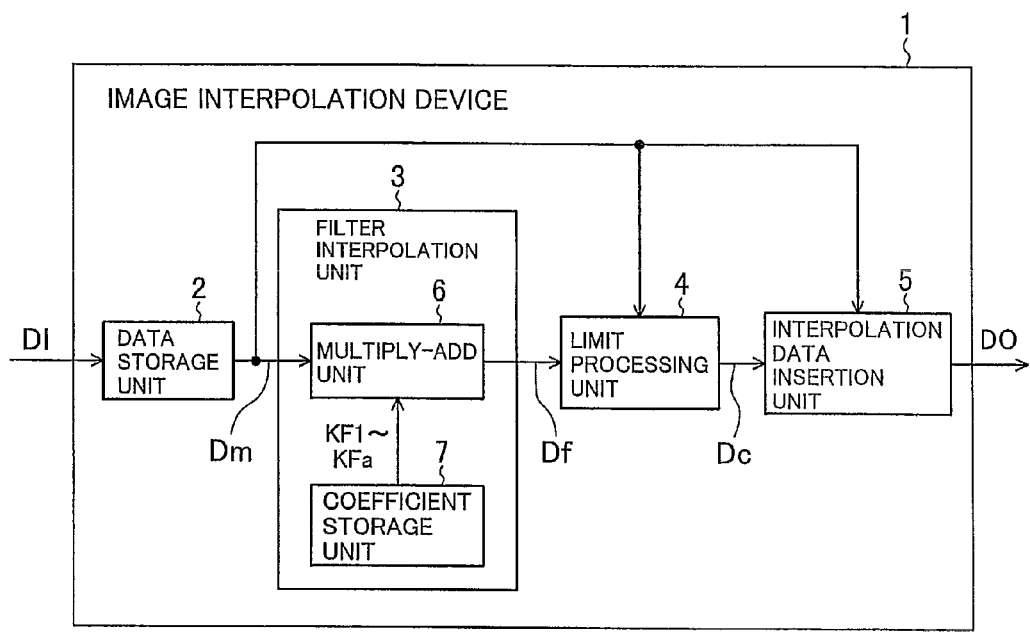
FIG. 1 illustrates the structure of an image interpolation device in a first embodiment of the invention.

FIG. 1 is a drawing showing the structure of an image interpolation device in a first embodiment of the invention.

The illustrated image interpolation device 1 comprises a data storage unit 2, a filter interpolation unit 3, a limit processing unit 4, and an interpolation data insertion unit 5.

Image data DI are input to the data storage unit 2.

The data storage unit 2 uses a cascaded plurality of flip-flops or the like to store, and output as data Dm, data in a certain interval in the vicinity of a missing pixel.

The data Dm are input to the Filter interpolation unit 3, limit processing unit 4, and interpolation data insertion unit 5.

The filter interpolation unit 3 has a multiply-add unit 6 and a coefficient storage unit 7. The coefficient storage unit 7 stores coefficients used in the multiply-add unit 6.

The multiply-add unit 6 performs a multiply-add operation by multiplying the data Dm read from the data storage unit 2 by low-pass interpolation filter coefficients KF1 to KFa output by the coefficient storage unit 7 and adding the products, and outputs the result as data Df.

Data Df are input to the limit processing unit 4.

The limit processing unit 4 processes data Df to place them within the range of data Dm, and outputs the result as data Dc.

Data Dc are input to the interpolation data insertion unit 5.

The interpolation data insertion unit 5 inserts data Dc into data Dm and outputs the result as data DO.

Figure 2:
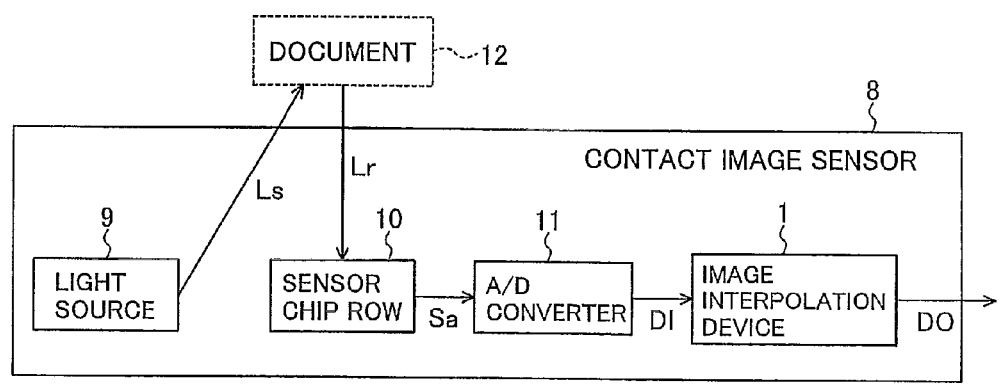
FIG. 2 illustrates the structure of a contact image sensor incorporating the inventive image interpolation device.

FIG. 2 illustrates the structure of a contact image sensor incorporating the inventive image interpolation device.

The contact image sensor 8 comprises a light source 9, a sensor chip row 10, an A/D converter 11, and an image interpolation device 1.

Although the inventive image interpolation device will be described as being installed in a contact image sensor 8 to carry out interpolation at the boundaries between sensor chips, as detailed below, the invention is not limited to interpolation at such boundaries in a contact image sensor. The invention is also useful when, for example, interpolation is carried out in areas that could not be read by a one-dimensional line sensor, or a two-dimensional image sensor for a camera, because of to pixel defects.

The operation of the contact image sensor 8 will now be described.

Light Ls emitted from the light source 9 illuminates a document 12.

Light Lr reflected by the document 12 illuminates the sensor chip row 10.

Light receiving elements in the sensor chip row 10 perform photoelectric conversion of the reflected light Lr, and output a signal Sa corresponding to Lr.

Signal Sa is input to the A/D converter 11.

The A/D converter 11 performs A/D conversion on signal Sa and outputs digital data DI.

Data DI are input to the image interpolation device 1.

The image interpolation device 1 outputs data DO with interpolation in regions corresponding to the boundaries of the sensor chips 13.

Data DO are used as sensed data for a scanner or a copier.

Relationships between the sensor chip row 10 and sensed data will now be described.

Figure 3A:
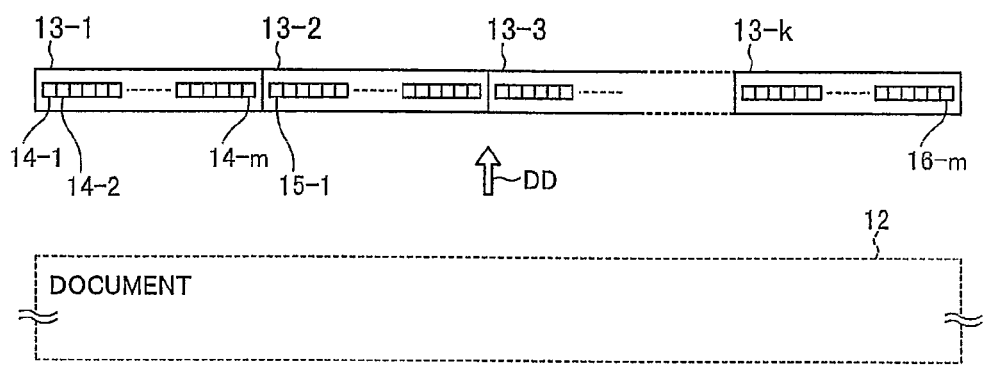
FIGS. 3(a) and 3(b) illustrate the structure of the row of sensor chips in the contact image sensor.
Figure 3B:
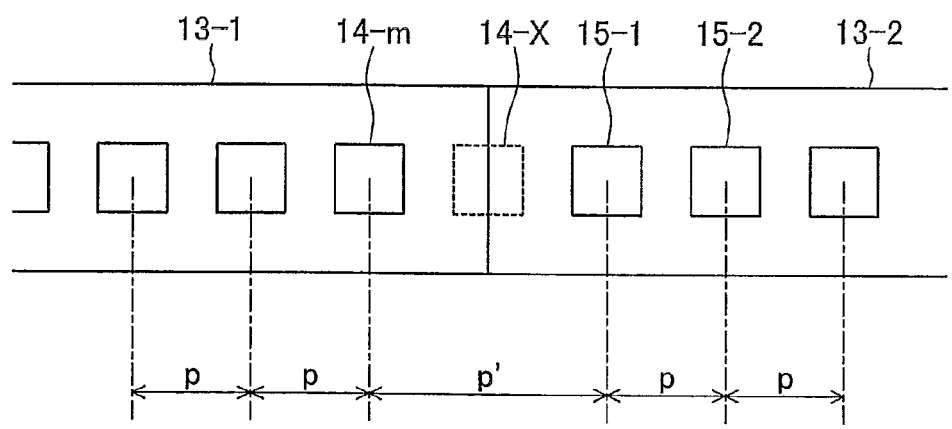

The sensor chip row 10 is a row of sensor chips arrayed in a straight line as shown in FIG. 3(*a*), each sensor chip having a plurality of light receiving elements (each corresponding to a pixel) aligned in a straight line, the sensor chips forming a line sensor with a linear array, that is, a one-dimensional array, of light receiving elements. More specifically, the sensor chip row 10 has k sensor chips 13-1, 13-2, 13-3, ..., 13-k arrayed in a straight line (k being an integer equal to or greater than two). Sensor chip 13-1 has m (m being an integer equal to or greater than two) light receiving elements such as photodiodes 14-1, 14-2, ..., 14-m arrayed in a straight line, and sensor chips 13-2 to 13-k likewise have m light receiving elements 15-1 to 16-m.

The document 12 is transported in the direction indicated of arrow DD, perpendicular to the direction in which the sensor chips 13-1 to 13-k are arrayed, and light Lr reflected by the document 12 is captured by the light receiving elements 14-1 to 16-m.

Because there are no light receiving elements at the boundaries of the sensor chips, reflected light Lr from the document 15 at the positions of these boundaries cannot be captured. For example, the position between the light receiving element 14-m at the rightmost end of sensor chip 13-1 and the light receiving element 15-1 at the leftmost end of sensor chip 13-2 is an end region (border region) of the sensor chips where light Lr reflected from the document 12 cannot be captured because of the lack of a light receiving element.

Thus, from the data acquired by the light receiving elements in the vicinity of a boundary between sensor chips, including the light receiving element 14-m at the rightmost end of sensor chip 13-1 and the light receiving element 15-1 at the leftmost end of sensor chip 13-2, the image interpolation device 1 generates data for the boundary, and inserts the generated data into a position corresponding to the boundary in the acquired data. The image interpolation device 1 also interpolates data for the boundary between sensor chips 13-2 and 13-3 and all other such boundaries in the sensor chip row, in the same way as at the boundary between sensor chips 13-1 and 13-2.

More particularly, as shown in FIG. 3(*b*), the light receiving elements 14-1 to 14-m on the sensor chips 13-1 to 13-k are arrayed in a straight line at a predetermined interval p (pixel pitch), but the light receiving elements positioned at the ends of the two interconnected sensor chips 13 are spaced apart from each other by a distance p'. For example, the distance between the light receiving element 14-m at the rightmost end of sensor chip 13-1 and the light receiving element 15-1 at the leftmost end of sensor chip 13-2 is p'.

By positioning the sensor chips so that p' is about twice p and performing interpolation as if there were a missing pixel 14-X between the sensor chips, interpolation results of high quality can be obtained. The description below will deal with the case in which is about twice p, but the invention is not necessarily limited to this distance; interpolation processing can be carried out as the distance requires.

Next, the operation of the image interpolation device 1 will be explained.

Figure 4A:
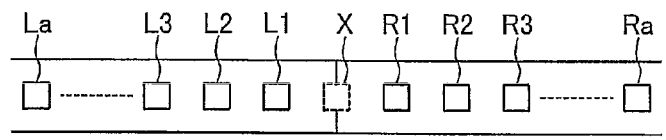
FIGS. 4(a) and 4(b) schematically illustrate the structure and operation of the data storage unit 2 in FIG. 1.
Figure 4B:
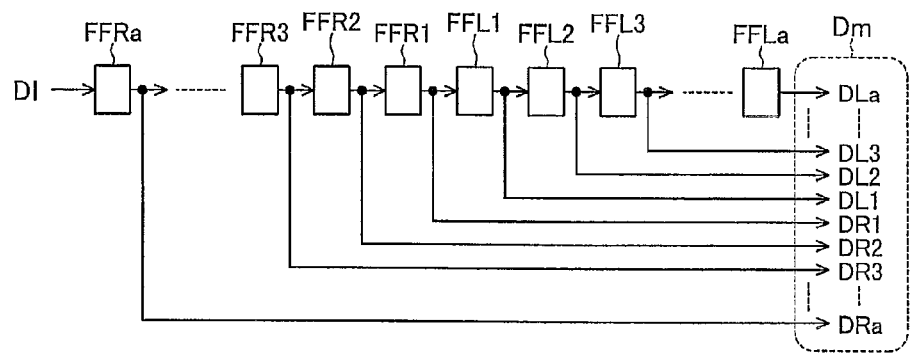

FIGS. 4(*a*) and 4(*b*) schematically illustrate the structure and operation of the data storage unit 2 in FIG. 1. FIG. 4(*a*) shows positional relationships of the light receiving elements in the vicinity of a boundary between sensor chips, while FIG. 4(*b*) shows the structure of the data storage unit 2.

The sensor chip row 10 can capture all the data for one horizontal line on the document 12 with one sensing operation, but the light receiving elements 14 can process data only one pixel at one time, so the data DI are input to the A/D converter 11 sequentially, starting from the left end of the line. In FIG. 4(*a*), data for pixels La, ..., L3, L2, L1, R1, R2, R3, ..., Ra are input in this order. Since there are no pixels at the boundaries between sensor chips, data cannot be sensed at position X. In this example, Ls (s=a to 1) are on the left side of the pixel at position X (the missing pixel), representing pixels at positions spaced apart from the missing pixel X by s pixel pitches, while Rs (s=1 to a) are on the right side of the pixel at position X (the missing pixel), representing pixels at positions spaced apart from the missing pixel X by s pixel pitches.

As shown in FIG. 4(*b*), the data storage unit 2 stores input data using a cascaded plurality of flip-flops FFRa to FFLa, and outputs data DLa to DRa in the vicinity of the boundary, which are stored in the flip-flops. DLa to DRa are the data of pixels La to Ra, respectively, and correspond to Dm in FIG. 1.

Data corresponding to the missing pixel X cannot be obtained as data DI, so there is a two-pitch wide interval between the pixel L1 corresponding to data DL1 and the pixel R1 corresponding to data DR1.

Figure 5:
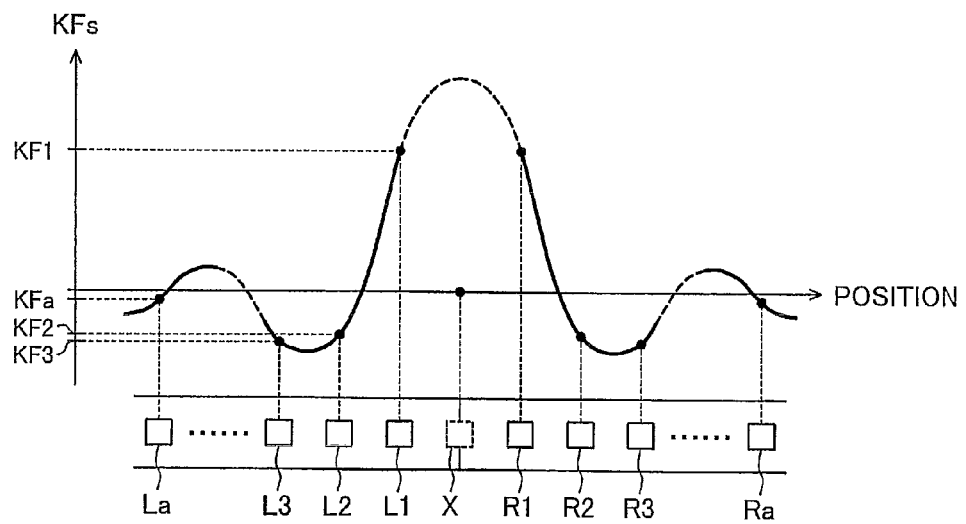
FIG. 5 illustrates the relationships between light-receiving elements in the vicinity of a boundary and coefficients stored in the coefficient storage unit 7.

FIG. 5 illustrates the relationships between light-receiving elements in the vicinity of a boundary and exemplary coefficients KFs (s=1, 2, ..., a) stored in the coefficient storage unit 7. The horizontal axis represents the positions of the light-receiving elements and the vertical axis represents the coefficients KFs. The coefficient for light-receiving elements L1 and R1 is KF1, the coefficient for L2 and R2 is KF2, the coefficient for L3 and R3 is KF3, and the coefficient for La and Ra is KFa. These coefficients KF1 to KFa correspond to KF1 to KFa in FIG. 1, and are collectively referred to as KF.

The value of the coefficient KF0 corresponding to the missing pixel is shown is shown as zero; the data of the missing pixel cannot be sensed, so no multiplication operation using coefficient KF0 is carried out in the multiply-add unit 6.

In the example shown in FIG. 5, the graph of the coefficients KFs (s=1 to a) is bilaterally symmetrical around the position of the missing pixel X, and the coefficients (KFs) for data DRs and data DLs are equal.

Besides the multiply-add unit 6 that performs multiply-add operations, the filter interpolation unit 3 has a coefficient storage unit 7 that stores coefficients used in the multiply-add unit 6. Except that the coefficient for the missing pixel is 0, the coefficients used in the multiply-add unit 6 are proportional to coefficients that would be used if the multiply-add unit 6 were a low-pass filter, and the sum of the coefficients is 1.

The coefficients by which the values of neighboring pixels are multiplied in the filter interpolation unit 3 are preferably given by the product of $\{\sin(g \times d)\}/(g \times d)$ and a second predetermined constant, where d is the distance of each of the neighboring pixels from the missing pixel and g is a first predetermined constant.

The multiply-add unit 6 performs a multiply-add operation on the data Dm output by the data storage unit 2, namely DLa to DRa, and the coefficients KF1 to KFa output by the sensor chip row 10, and outputs data Df. The data Df are given by:

$$Df=KF1 \times DL1+KF2 \times DL2+KF3 \times DL3+\ldots+KFa \times DLa+KF1 \times DR1+KF2 \times DR2+KF3 \times DR3+\ldots+KFa \times Dra$$

As detailed below, except that the coefficient for the missing pixel or for the pixel to be interpolated is 0, the coefficients KF1 to KFa stored in the coefficient storage unit 7 are proportional to coefficients that would be used if the multiply-add unit 6 were a low-pass filter, and the sum of the coefficients is unity. Next, how the coefficients KF1 to KFa stored in the coefficient storage unit 7 are determined will be explained.

A low-pass interpolation filter is generated from a low-pass filter, and the coefficients of the low-pass interpolation filter are used as KF1 to KFa.

First, the low-pass filter will be described.

Figure 6:
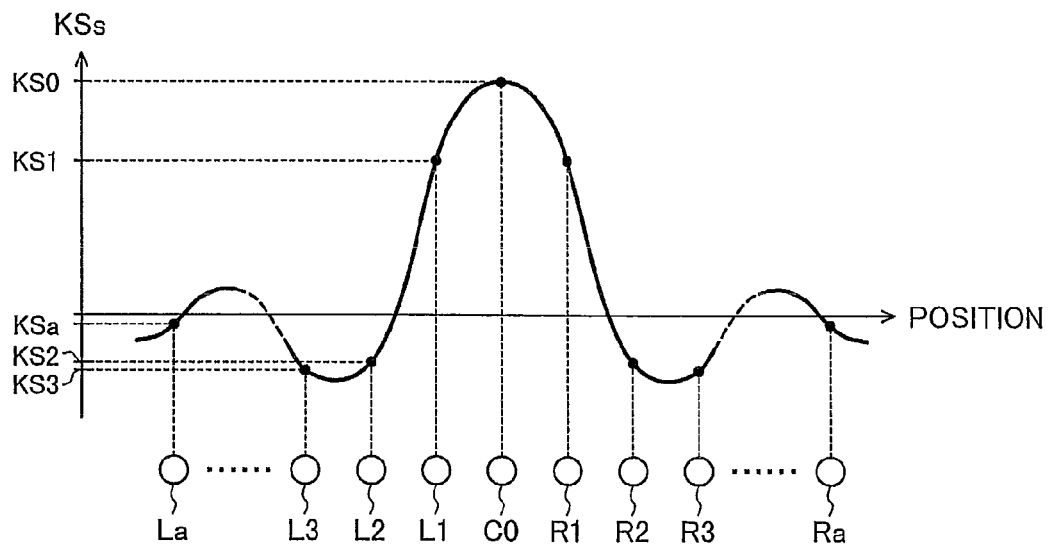
FIG. 6 illustrates the positional relationships between low-pass filter coefficients and pixels.

FIG. 6 illustrates the positional relationships between exemplary coefficients of the low-pass filter and pixels. The horizontal axis represents pixel position (position relative to the pixel being processed); the vertical axis represents the values of the coefficient KSs by which the data of the pixels at these relative positions are multiplied. The coefficient for the pixel of interest P0 has value KS0, the coefficient for L1 and R1 has value KS1, the coefficient for L2 and R2 has value KS2, the coefficient for L3 and R3 has value KS3, and the coefficient for La and Ra has value KSa.

The values of the coefficients KSs shown in FIG. 6 are given by the following equation (1).

[Mathematical expression 1]

$$KSs = KS0 \times \frac{\sin(g \times d)}{(g \times d)} \quad (1)$$

In equation (1), $$KS0=2Fc/Fs \quad (2)$$

Fs is the sampling frequency (a spatial frequency), equal to the reciprocal (1/p) of the pixel pitch p, and Fc is the cutoff frequency (a spatial frequency).

d is the distance of each neighboring pixel (each neighboring pixel to be multiplied by a coefficient) from the pixel being processed, and is the product of the pixel pitch p and a value s expressing the distance of the neighboring pixel from the pixel being processed in units of the pixel pitch; d is given by:

$$d=s \times p=s/Fs \quad (3)$$

The constant g is given by:

$$g=2\pi \times Fc \quad (4)$$

If equation (1) is rewritten by substitution of equations (2), (3), and (4), it becomes:

[Mathematical expression 2]

$$KSs = (2Fc/Fs) \times \frac{\sin(2\pi \times (Fc/Fs) \times s)}{(2\pi \times (Fc/Fs) \times s)} \quad (5)$$

or $$KSs = (2Fc/Fs) \times \frac{\sin(2\pi \times Fc \times p \times s)}{(2\pi \times Fc \times p \times s)} \quad (6)$$

When the data DC0 of the pixel of interest C0, the data DLa to DRa of the pixels La to Ra in the vicinity of the pixel of interest, and the coefficients KS0 to KSa are multiplied and added, low-pass filtered data Dlpf(DC0) are obtained for the pixel of interest C0. The value of the data Dlpf(DC0) is:

$$Dlpf(DC0) = KS0 \times DC0 + KS1 \times DL1 + KS2 \times DL2 + KS3 \times DL3 + \ldots + KSa \times DLa + KS1 \times DR1 + KS2 \times DR2 + KS3 \times DR3 + \ldots + KSa \times DRa$$

The sum of the coefficients used in the multiply-add operation is 1. That is:

$$KS0 + KS1 + KS2 + KS3 + \ldots + KSa + KS1 + KS2 + KS3 + \ldots + KSa = 1$$

Next the low-pass interpolation filter will be described.

The coefficients of the low-pass interpolation filter shown in FIG. 5 are calculated from the coefficients of the low-pass filter shown in FIG. 6. Since data cannot be sensed at the boundary position in FIG. 5, the data at the boundary position X cannot be used in the multiply-add operation. The coefficient KS0 in FIG. 6 is therefore assumed to be 0, and coefficients KF1 to KFa are calculated so as to make the sum of the coefficients, excluding the coefficient for the boundary position X, equal to unity. Coefficients KF1 to KFa (KFs (s=1, 2, . . . , a)) are calculated as follows:

$$KF1=KS1/SKS$$

$$KF2=KS2/SKS$$

$$KF3=KS3/SKS$$

. . .

$$KFa=KSa/SKS$$

and in general $$KFs = KSs/SKS$$

(where, $$SKS = KS1 + KS2 + KS3 + \ldots + KSa + KS1 + KS2 + KS3 + \ldots + KS$$
$$= 2 \times (KS1 + KS2 + KS3 + \ldots + KSa)$$

The operation of the filter interpolator will now be described using a specific example. First the frequency characteristic of a specific low-pass filter will be described; then the frequency characteristic of a low-pass interpolation filter generated from the coefficients of the specific low-pass filter will be described.

Figure 7:
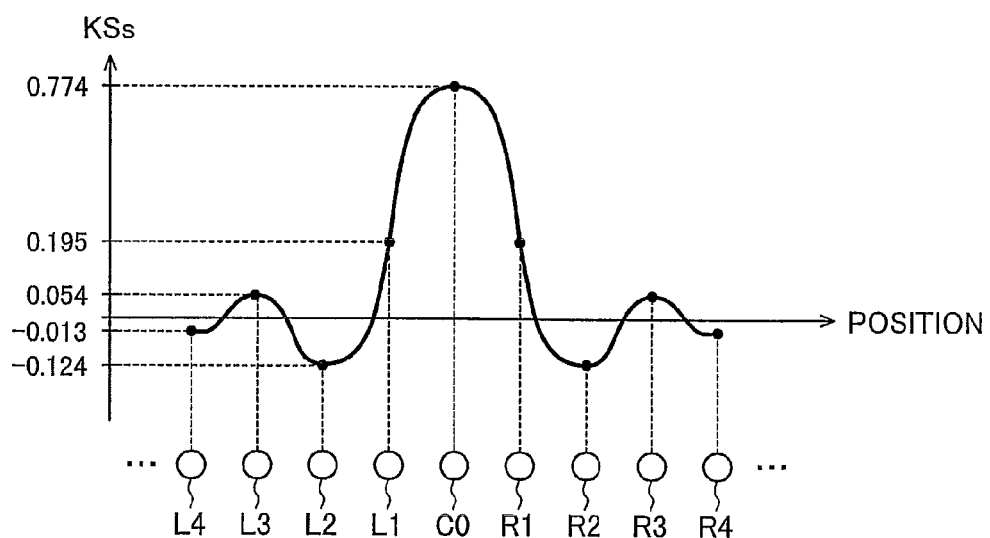
FIG. 7 illustrates the relationships, used in a specific low-pass filter, between the relative positions of pixels neighboring a pixel of interest in relation to the pixel of interest and the coefficients by which the data of the neighboring pixels are multiplied.

FIG. 7 illustrates the relationships, used in a specific low-pass filter, between the relative positions of pixels neighboring the pixel of interest in relation to the pixel of interest and the coefficients by which the data of the neighboring pixels are multiplied. The horizontal axis represents the positions while the vertical axis represents the coefficients. The drawing shows an example in which the coefficient KS0 of the pixel of interest C0 is 0.774, the coefficient KS1 of pixels L1 are R1 is 0.195, the coefficient KS2 of pixels L2 and R2 is −0.124, the coefficient KS3 of pixels L3 and R3 is 0.054, and the coefficient KS4 of pixels L4 and R4 is −0.013.

The processing (filtering) carried out using the low-pass filter in FIG. 7 on data with an eight-pixel period, data with a four-pixel period, data with a three-pixel period, and data with a two-pixel period will be described with reference to FIGS. 8(a) to 8(c) to 11(a) to 11(c). Among these drawings, FIGS. 8(a), 9(a), 10(a), and 11(a) are identical, representing the coefficients of the specific low-pass filter shown in FIG. 7. That is, these drawings illustrate the relationships between relative position s with respect to the pixel being processed at position i and the coefficient KSs by which the data D at relative position s are multiplied. FIGS. 8(b) and 8(c), 9(b) and 9(c), 10(b) and 10(c), and 11(b) and 11(c) illustrate the relationships between pixel position (the position of the pixel being processed being represented by the symbol i, and the positions of pixels in the vicinity of the pixel being processed being represented as i+s (s=−4 to 4)), and the data D at that position (the horizontal axis representing pixel position while the vertical axis represents data).

FIGS. 8(a) to 8(c) illustrate the processing of data with an eight-pixel period. FIG. 8(b) illustrates the processing of an upward peak in the data; FIG. 8(c) illustrates the processing of a downward peak in the data.

When the data in the i-th position in FIG. 8(b) are processed, since $D(i-4)=0, D(i-3)=0.15, D(i-2)=0.5,$ $D(i-1)=0.85, D(i)=1, D(i+1)=0.85,$ $D(i+2)=0.5, D(i+3)=0.15, D(i+4)=0$ the processed value Dlpf(i) of the data is:

$$Dlpf(i) = 0.013 \times 0 + 0.054 \times 0.15 - 0.124 \times 0.5 + 0.195 \times$$
$$0.85 + 0.774 \times 1 + 0.195 \times 0.85 - 0.124 \times 0.5 +$$
$$0.054 \times 0.15 - 0.013 \times 0$$
$$= 1$$

When the data in the i-th position in FIG. 8(c) are processed, since $D(i-4)=1, D(i-3)=0.85, D(i-2)=0.5,$ $D(i-1)=0.15, D(i)=0, D(i+1)=0.15,$ $D(i+2)=0.4, D(i+3)=0.85, D(i+4)=1,$ the processed value Dlpf(i) of the data is:

$$Dlpf(i) = 0.013 \times 1 + 0.054 \times 0.85 - 0.124 \times 0.5 + 0.195 \times$$
$$0.15 + 0.774 \times 0 + 0.195 \times 0.15 - 0.124 \times 0.5 +$$
$$0.054 \times 0.85 - 0.013 \times 1$$
$$= 0$$

Accordingly, if the sampling frequency of the data is Fs, the gain G(Fs/8) of the data with an eight-pixel period is:

$$Glpf(Fs/8) = |\text{ amplitude of processed data/amplitude of input data}|$$
$$= |(1-0)/(1-0)|$$
$$= 1$$

FIGS. 9(a) to 8(c) illustrate the processing of data with a four-pixel period. FIG. 9(b) illustrates the processing of an upward peak in the data; FIG. 9(c) illustrates the processing of a downward peak in the data.

When the data in the i-th position in FIG. 9(b) are processed, since $D(i-4)=1, D(i-3)=0.5, D(i-2)=0,$ $D(i-1)=0.5, D(i)=1, D(i+1)=0.5,$ $D(i+2)=0, D(i+3)=0.5, D(i+4)=1$ the processed value Dlpf(i) of the data is:

$$Dlpf(i) = -0.013 \times 1 + 0.054 \times 0.5 - 0.124 \times 0 + 0.195 \times$$
$$0.5 + 0.774 \times 1 + 0.195 \times 0.5 - 0.124 \times 0 +$$
$$0.054 \times 0.5 - 0.013 \times 1$$
$$= 1$$

When the data in the i-th position in FIG. 9(c) are processed, since $D(i-4)=0, D(i-3)=0.5, D(i-2)=1,$ $D(i-1)=0.5, D(i)=0, D(i+1)=0.5,$ $D(i+2)=1, D(i+3)=0.5, D(i+4)=0,$ the processed value Dlpf(i) of the data is:

$$Dlpf(i) = -0.013 \times 0 + 0.054 \times 0.5 - 0.124 \times 1 + 0.195 \times$$
$$0.5 + 0.774 \times 0 + 0.195 \times 0.5 - 0.124 \times 1 +$$
$$0.054 \times 0.5 - 0.013 \times 0$$
$$= 0$$

Accordingly, the gain Glpf(Fs/4) of the data with a four-pixel period is:

$$Glpf(Fs/4) = |\text{ amplitude of processed data/amplitude of input data}|$$
$$= |(1-0)/(1-0)|$$
$$= 1$$

FIGS. 10(a) to 10(c) illustrate the processing of data with a three-pixel period. FIG. 10(b) illustrates the processing of an upward peak in the data; FIG. 10(c) illustrates the processing of a downward peak in the data.

When the data in the i-th position in FIG. 10(b) are processed, since $$D(i-4)=0.25, D(i-3)=1, D(i-2)=0.25,$$

$$D(i-1)=0.25, D(i)=1, D(i+1)=0.25,$$

$$D(i+2)=0.25, D(i+3)=1, D(i+4)=0.25$$

the processed value Dlpf(i) of the data is:

$$Dlpf(i) = -0.013 \times 0.25 + 0.054 \times 1 - 0.124 \times 0.25 + 0.195 \times$$
$$0.25 + 0.774 \times 1 + 0.195 \times 0.25 - 0.124 \times 0.25 +$$
$$0.054 \times 1 - 0.013 \times 0.25$$
$$= 0.91$$

When the data in the i-th position in FIG. 10(c) are processed, since $$D(i-4)=0.75, D(i-3)=0, D(i-2)=0.75,$$

$$D(i-1)=0.75, D(i)=0, D(i+1)=0.75,$$

$$D(i+2)=0.75, D(i+3)=0, D(i+4)=0.75$$

the processed value Dlpf(i) of the data is:

$$Dlpf(i) = -0.013 \times 0.75 + 0.054 \times 0 - 0.124 \times 0.75 + 0.195 \times$$
$$0.75 + 0.774 \times 0 + 0.195 \times 0.75 - 0.124 \times 0.75 +$$
$$0.054 \times 1 - 0.013 \times 0.75$$
$$= 0.09$$

Accordingly, the gain Glpf(Fs/3) of the data with a three-pixel period is:

$$Glpf(Fs/3) = |\text{amplitude of processed data/amplitude of input data}|$$
$$= |(0.91 - 0.09)/(1 - 0)|$$
$$= 0.82$$

FIGS. 11(a) to 11(c) illustrate the processing of data with a two-pixel period. FIG. 11(b) illustrates the processing of an upward peak in the data; FIG. 11(c) illustrates the processing of a downward peak in the data.

When the data in the i-th position in FIG. 11(b) are processed, since $$D(i-4)=1, D(i-3)=0, D(i-2)=1,$$

$$D(i-1)=0, D(i)=1, D(i+1)=0,$$

$$D(i+2)=1, D(i+3)=0, D(i+4)=1$$

the processed value Dlpf(i) of the data is:

$$Dlpf(i) = -0.013 \times 1 + 0.054 \times 0 - 0.124 \times 1 + 0.195 \times$$
$$0 + 0.774 \times 1 + 0.195 \times 0 - 0.124 \times 1 +$$
$$0.054 \times 0 - 0.013 \times 1$$
$$= 0.5$$

When the data in the i-th position in FIG. 11(c) are processed, since $$D(i-4)=0, D(i-3)=1, D(i-2)=0,$$

$$D(i-1)=1, D(i)=0, D(i+1)=1,$$

$$D(i+2)=0, D(i+3)=1, D(i+4)=0,$$

the processed value Dlpf(i) of the data is:

$$Dlpf(i) = -0.013 \times 0 + 0.054 \times 1 - 0.124 \times 0 + 0.195 \times$$
$$1 + 0.774 \times 0 + 0.195 \times 1 - 0.124 \times 0 +$$
$$0.054 \times 1 - 0.013 \times 0$$
$$= 0.5$$

Accordingly, the gain Glpf(Fs/2) of the data with a two-pixel period is:

$$Glpf(Fs/2) = |\text{amplitude of processed data/amplitude of input data}|$$
$$= |(0.5 - 0.5)/(1 - 0)|$$
$$= 0$$

The processing of data peaks has been described above; the portions other than the peaks are processed in a similar manner.

Figure 12:
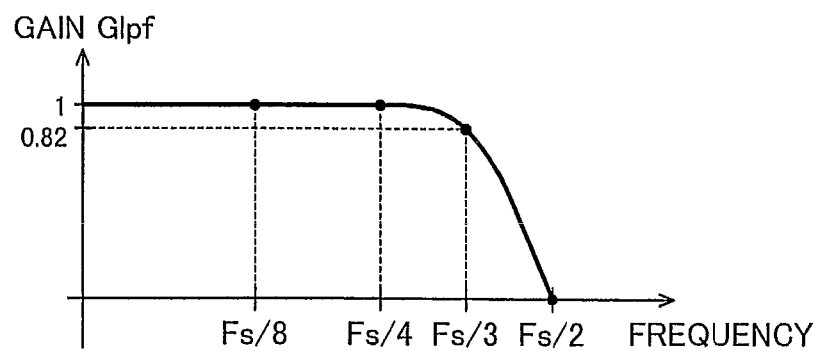
FIG. 12 illustrates the frequency characteristic of the low-pass filter in FIG. 7.

FIG. 12 illustrates the frequency characteristic of the low-pass filter in FIG. 7. The horizontal axis represents frequency and the vertical axis represents gain. As shown in 8(a) to 8(c) to 11(a) to 11(c), the low-pass filter in FIG. 7 has gain Glpf (Fs/8)=1 for an eight-pixel period, gain G(Fs/4)=1 for a four-pixel period, gain G(Fs/3)=0.82 for a three-pixel period and gain G(Fs/2)=0 for a two-pixel period.

Figure 13:
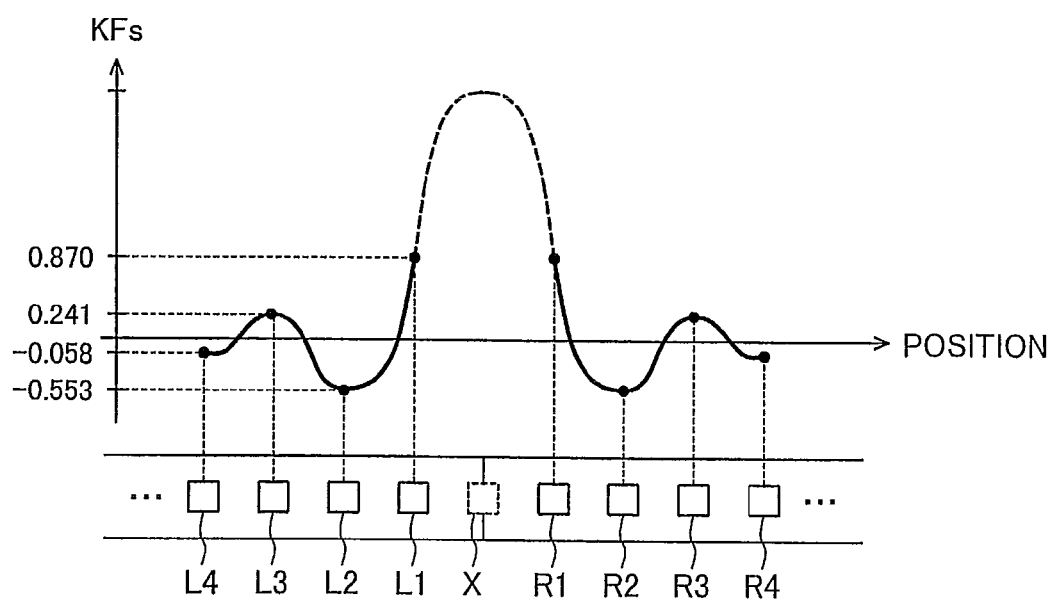
FIG. 13 is a drawing illustrating the coefficients of the low-pass interpolation filter calculated from the specific low-pass filter in FIG. 7.

FIG. 13 is a drawing illustrating the coefficients of the low-pass interpolation filter calculated from the specific low-pass filter in FIG. 7. The horizontal axis represents position relative to the missing pixel (the pixel to be interpolated) while the vertical axis represents the coefficients by which the data of the pixels at the relative positions are multiplied.

A method of determining the coefficients for the low-pass interpolation filter from the specific low-pass filter shown in FIG. 7 will now be described.

The coefficient of the pixel of interest C0 in FIG. 7 is set to 0 and the sum of the coefficients of pixels L1 to L4 and R1 to R4 is set to unity. Coefficients KF1 to KF4 are calculated as follows:

$$KF1 = KS1/(KS1 + KS2 + KS3 + KS4 + KS1 + KS2 + KS3 + KS4)$$
$$= 0.195 \Big/ \left( \begin{array}{c} 0.195 - 0.124 + 0.054 - 0.013 + \\ 0.195 - 0.124 + 0.054 - 0.013 \end{array} \right)$$
$$= 0.870$$

$$KF2 = KS2/(KS1 + KS2 + KS3 + KS4 + KS1 + KS2 + KS3 + KS4)$$
$$= -0.124 \Big/ \left( \begin{array}{c} 0.195 - 0.124 + 0.054 - 0.013 + \\ 0.195 - 0.124 + 0.054 - 0.013 \end{array} \right)$$
$$= -0.553$$

$$KF3 = KS3/(KS1 + KS2 + KS3 + KS4 + KS1 + KS2 + KS3 + KS4)$$
$$= 0.054 \Big/ \binom{0.195 - 0.124 + 0.054 - 0.013 +}{0.195 - 0.124 + 0.054 - 0.013}$$
$$= 0.241$$

$$KF4 = KS4/(KS1 + KS2 + KS3 + KS4 + KS1 + KS2 + KS3 + KS4)$$
$$= -0.013 \Big/ \binom{0.195 - 0.124 + 0.054 - 0.013 +}{0.195 - 0.124 + 0.054 - 0.013}$$
$$= -0.058$$

Interpolation of a pixel i at a boundary in data with an eight-pixel period, data with a four-pixel period, data with a three-pixel period, and data with a two-pixel period, using the low-pass interpolation filter in FIG. 13, will be described with reference to FIGS. 14(a) to 14(c) to 17(a) to 17(c). Among these drawings, FIGS. 14(a), 15(a), 16(a) and 17(a) identically represent the coefficients KFs of the specific low-pass interpolation filter shown in FIG. 13. That is, these drawings illustrate the relationships between position s relative to the pixel to be interpolated at position i, and the coefficient KFs by which the data D at relative position s are multiplied in the low-pass interpolation filter. FIGS. 14(b) and 14(c), 15(b) and 15(c), 16(b) and 16(c), and 17(b) and 17(c) illustrate the relationships between pixel position (the position of the pixel to be interpolated is represented by the symbol i; the positions of pixels in its vicinity are represented by the symbols i+s (s=−4 to 4)) and the magnitude of the data D at that position (the horizontal axis represents pixel position while the vertical axis represents data).

FIGS. 14(a) to 14(c) illustrate the processing of data with an eight-pixel period. FIG. 14(b) illustrates the processing of an upward peak in the data; FIG. 14(c) illustrates the processing of a downward peak in the data.

When the data in the i-th position in FIG. 14(b) are processed, since $$D(i-4)=0, D(i-3)=0.15, D(i-2)=0.5,$$

$$D(i-1)=0.85, D(i+1)=0.85, D(i+2)=0.5,$$

$$D(i+3)=0.15, D(i+4)=0$$

the interpolated value Df(i) of the data is:

$$Df(i) = 0.058 \times 0 + 0.241 \times 0.15 - 0.553 \times 0.5 + 0.870 \times$$
$$0.85 + 0.870 \times 0.85 - 0.553 \times 0.5 +$$
$$0.241 \times 0.15 - 0.058 \times 0$$
$$= 0.9983$$

When the data in the i-th position in FIG. 14(c) are processed, since $$D(i-4)=1, D(i-3)=0.85, D(i-2)=0.5,$$

$$D(i-1)=0.15, D(i+1)=0.15, D(i+2)=0.5,$$

$$D(i+3)=0.85, D(i+4)=1$$

the interpolated value Df(i) of the data is:

$$Df(i) = -0.058 \times 1 + 0.241 \times 0.85 - 0.553 \times 0.5 + 0.870 \times$$
$$0.15 + 0.870 \times 0.15 - 0.553 \times 0.5 +$$
$$0.241 \times 0.85 - 0.058 \times 1$$
$$= 0.0017$$

Accordingly, the gain Gf(Fs/8) of the data with an eight-pixel period is:

$$Gf(Fs/8) = |\text{amplitude of processed data/amplitude of input data}|$$
$$= |(0.9983 - 0.0017)/(1 - 0)|$$
$$= 0.9966$$

Figures 15A, 15B, 15C:
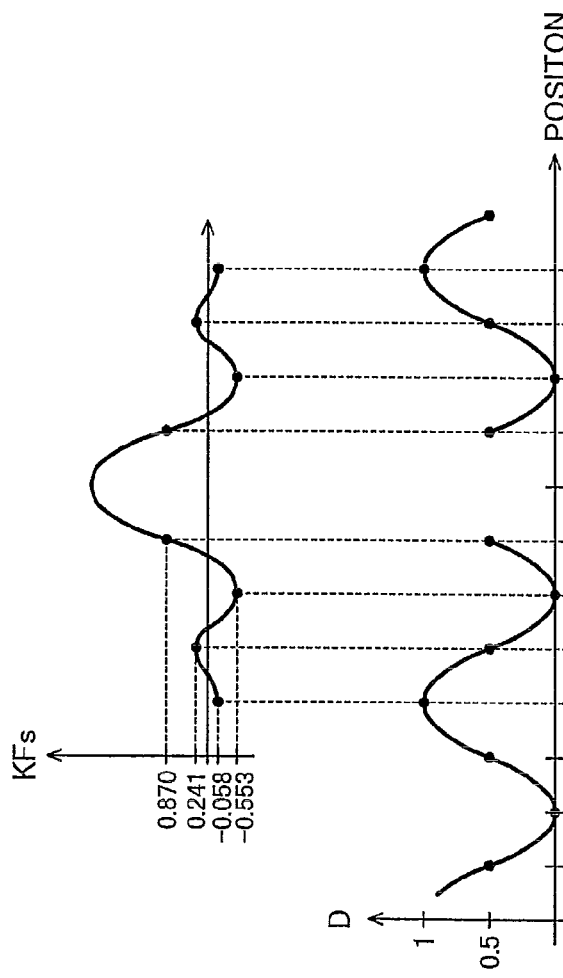
FIGS. 15(a) to 15(c) are drawings illustrating the relationships between data and the coefficients by which the data are multiplied when the pixel i at a boundary in data with a four-pixel period is interpolated using the low-pass interpolation filter in FIG. 13.

FIGS. 15(a) to 15(c) illustrate the processing of data with a four-pixel period. FIG. 15(b) illustrates the processing of an upward peak in the data; FIG. 15(c) illustrates the processing of a downward peak in the data.

When the data in the i-th position in FIG. 15(b) are processed, since $$D(i-4)=1, D(i-3)=0.5, D(i-2)=0,$$

$$D(i-1)=0.5, D(i+1)=0.5, D(i+2)=0,$$

$$D(i+3)=0.5, D(i+4)=1$$

the interpolated value Df(i) of the data is:

$$Df(i) = -0.058 \times 1 + 0.241 \times 0.5 - 0.553 \times 0 + 0.870 \times$$
$$0.5 + 0.870 \times 0.5 - 0.553 \times 0 +$$
$$0.241 \times 0.5 - 0.058 \times 1$$
$$= 0.995$$

When the data in the i-th position in FIG. 15(c) are processed, since $$D(i-4)=0, D(i-3)=0.5, D(i-2)=1,$$

$$D(i-1)=0.5, D(i+1)=0.5, D(i+2)=1,$$

$$D(i+3)=0.5, D(i+4)=0$$

the interpolated value Df(i) of the data is:

$$Df(i) = -0.058 \times 0 + 0.241 \times 0.5 - 0.553 \times 1 + 0.870 \times$$
$$0.5 + 0.870 \times 0.5 - 0.553 \times 1 +$$
$$0.241 \times 0.5 - 0.058 \times 0$$
$$= 0.005$$

Accordingly, the gain Gf(Fs/4) of the data with a four-pixel period is:

$$Gf(Fs/4) = |\text{amplitude of processed data/amplitude of input data}|$$
$$= |(0.995 - 0.005)/(1 - 0)|$$
$$= 0.99$$

Figures 16A, 16B, 16C:
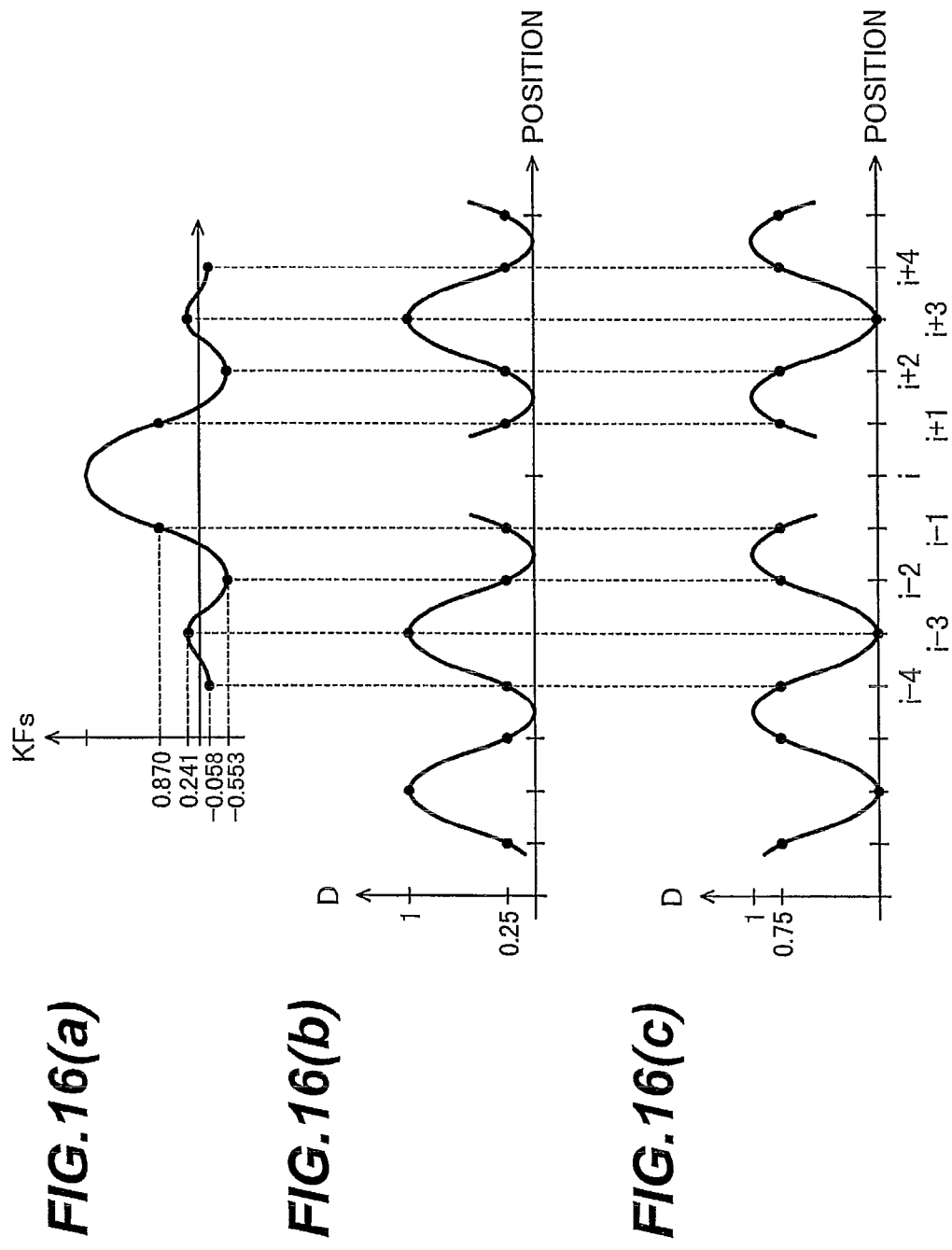
FIGS. 16(a) to 16(c) are drawings illustrating the relationships between data and the coefficients by which the data are multiplied when the pixel i at a boundary in data with a three-pixel period is interpolated using the low-pass interpolation filter in FIG. 13.

FIGS. 16(a) to 16(c) illustrate the processing of data with a three-pixel period. FIG. 16(b) illustrates the processing of an upward peak in the data; FIG. 16(c) illustrates the processing of a downward peak in the data.

When the data in the i-th position in FIG. 16(b) are interpolated, since $D(i-4)=0.25, D(i-3)=1, D(i-2)=0.25,$ $D(i-1)=0.25, D(i+1)=0.25, D(i+2)=0.25,$ $D(i+3)=1, D(i+4)=0.25$ the interpolated value DO(i) of data is:

$$DO(i) = -0.058 \times 0.25 + 0.241 \times 1 - 0.553 \times 0.25 + 0.870 \times$$
$$0.25 + 0.870 \times 0.25 - 0.553 \times 0.25 +$$
$$0.241 \times 1 - 0.058 \times 0.25$$
$$= 0.6115$$

When the data in the i-th position in FIG. 16(c) are interpolated, since $D(i-4)=0.75, D(i-3)=0, D(i-2)=0.75,$ $D(i-1)=0.75, D(i+1)=0.75, D(i+2)=0.75,$ $D(i+3)=0, D(i+4)=0.75$ the interpolated value DO(i) of the data is:

$$DO(i) = -0.058 \times 0.75 + 0.241 \times 0 - 0.553 \times 0.75 + 0.870 \times$$
$$0.75 + 0.870 \times 0.75 - 0.553 \times 0.75 +$$
$$0.241 \times 0 - 0.058 \times 0.75$$
$$= 0.3885$$

Accordingly, the gain Gf(Fs/3) of the data with a three-pixel period is:

$$Gf(Fs/3) = |\text{ amplitude of processed data/amplitude of input data}|$$
$$= |(0.6115 - 0.3885)/(1 - 0)|$$
$$= 0.223$$

FIGS. 17(a) to 17(c) illustrate the processing of data with a two-pixel period. FIG. 17(b) illustrates the processing of an upward peak in the data; FIG. 17(c) illustrates the processing of a downward peak in the data.

When data are interpolated at the i-th position in FIG. 17(b), if the interpolated data DO(i-1) is calculated, since $D(i-4)=1, D(i-3)=0, D(i-2)=1, D(i-1)=0,$ $D(i+1)=0, D(i+2)=1, D(i+3)=0, D(i+4)=1$ the interpolated value Df(i) of the data is:

$$Df(i) = -0.058 \times 1 + 0.241 \times 0 - 0.553 \times 1 + 0.870 \times$$
$$0 + 0.870 \times 0 - 0.553 \times 1 + 0.241 \times 0 - 0.058 \times 1$$
$$= -1.222$$

When the data at the i-th position in FIG. 17(c) are processed, since $D(i-4)=0, D(i-3)=1, D(i-2)=0, D(i-1)=1,$ $D(i+1)=1, D(i+2)=0, D(i+3)=1, D(i+4)=0$ the interpolated value Df(i) of data is:

$$Df(i) = -0.058 \times 0 + 0.241 \times 1 - 0.553 \times 0 + 0.870 \times$$
$$1 + 0.870 \times 1 - 0.553 \times 0 + 0.241 \times 1 - 0.058 \times 0$$
$$= 2.222$$

Accordingly, the gain Gf(Fs/2) of the data with a two-pixel period is:

$$Gf(Fs/2) = |\text{ amplitude of processed data/amplitude of input data}|$$
$$= |(-1.222 - 2.222)/(1 - 0)|$$
$$= 3.444$$

Figure 18:
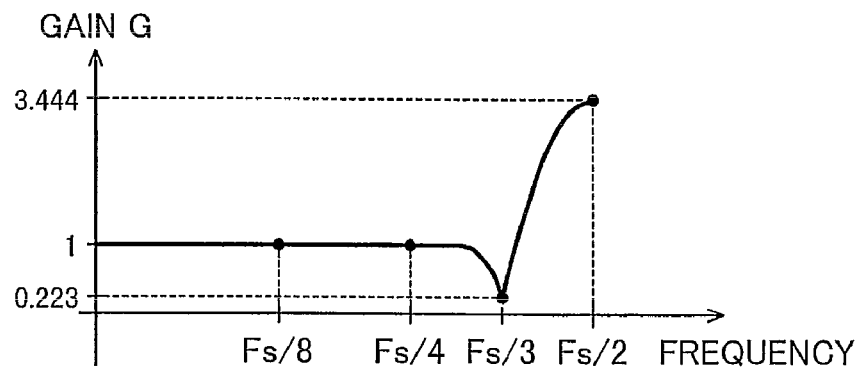
FIG. 18 is a drawing illustrating the frequency characteristic of the low-pass interpolation filter in FIG. 13.

FIG. 18 illustrates the frequency characteristic of the low-pass interpolation filter in FIG. 13. The horizontal axis represents frequency while the vertical axis represents gain. As shown in FIGS. 14(a) to 14(c) to 17(a) to 17(c), the low-pass interpolation filter in FIG. 13 has gain G(Fs/8)=0.9966 for an eight-pixel period, gain G(Fs/4)=0.99 for a four-pixel period, gain G(Fs/3)=0.223 for a three-pixel period, and gain G(Fs/2)=3.44 for a two-pixel period.

The gain of the low-pass interpolation filter is unity in the frequency range where the gain of the low-pass filter shown in FIG. 6 is unity, but in the frequency range where the gain is less than unity, its characteristic differs from that of the low-pass filter. In particular, its gain becomes larger than unity at high frequencies.

The filter interpolation unit 3 can interpolate data properly in the frequency range where the gain of a low-pass filter of the type shown in FIG. 6 is unity. In other frequency ranges, however, it cannot interpolate properly.

The operation of the limit processing unit 4 will now be described. The limit processing unit 4 calculates the maximum value max(Dm) and minimum value min(Dm) of data Dm, outputs Dc=max(Dm) when the value of the data Df output by the filter interpolation unit 3 is larger than max (Dm), outputs Dc=min(Dm) when the value of the data Df is smaller than min(Dm), and outputs Dc=Df when the value of the data Df is equal to or greater than min(Dm) but equal to or less than max(Dm).

For example, for the data with a two-period pixel shown in FIGS. 17(a) to 17(c), max(Dm)=1 and min(Dm)=0. Therefore, when position i in FIG. 17(b) is interpolated, Dc(i)=1 since interpolated data Df(i)=2.222, while when position i in FIG. 17(c) is interpolated, Dc(i)=0 since interpolated data Df(i)=-1.222.

By limiting the data Df output by the filter interpolation unit 3 to within the range of data Dm, interpolation error can be suppressed when high-frequency data are interpolated.

The interpolation described above is performed by hardware, but the interpolation may also be performed by software or a combination of hardware and software.

Figure 19:
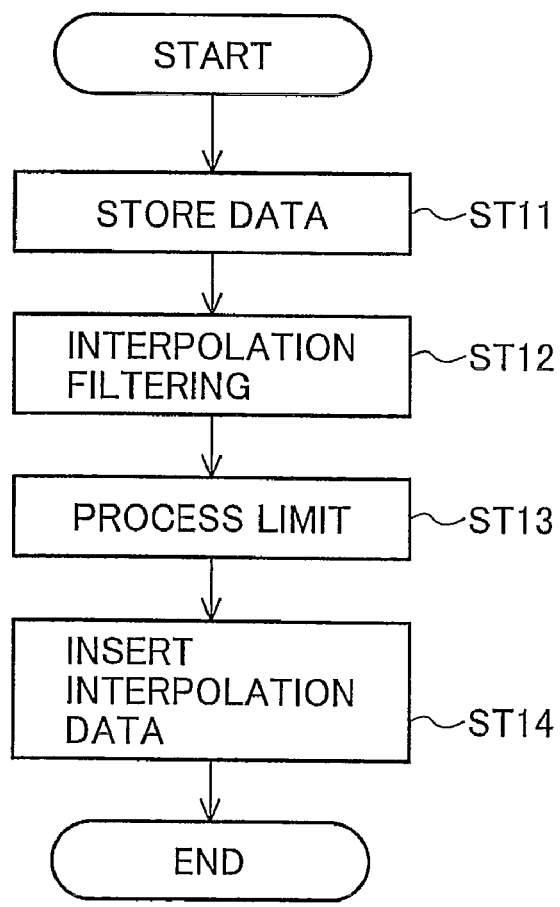
FIG. 19 is a flowchart illustrating operations performed by software processing.

FIG. 19 is a flowchart illustrating the processing procedure in this case.

In step ST11, the data Dm in the vicinity of a missing pixel are stored.

In step ST12, the data Df are generated by performing a multiply-add operation using the coefficients KF determined from the coefficients of the low-pass filter determined as above.

In step ST13, data Dc are generated by limiting data Df to the range of data Dm.

In step ST14, data DO are generated that have data Dc inserted into the position corresponding to the boundary in data Dm.

The detailed processing at each step has been described with reference to FIG. 1, so explanations will be omitted here.

Second Embodiment

Figure 20:
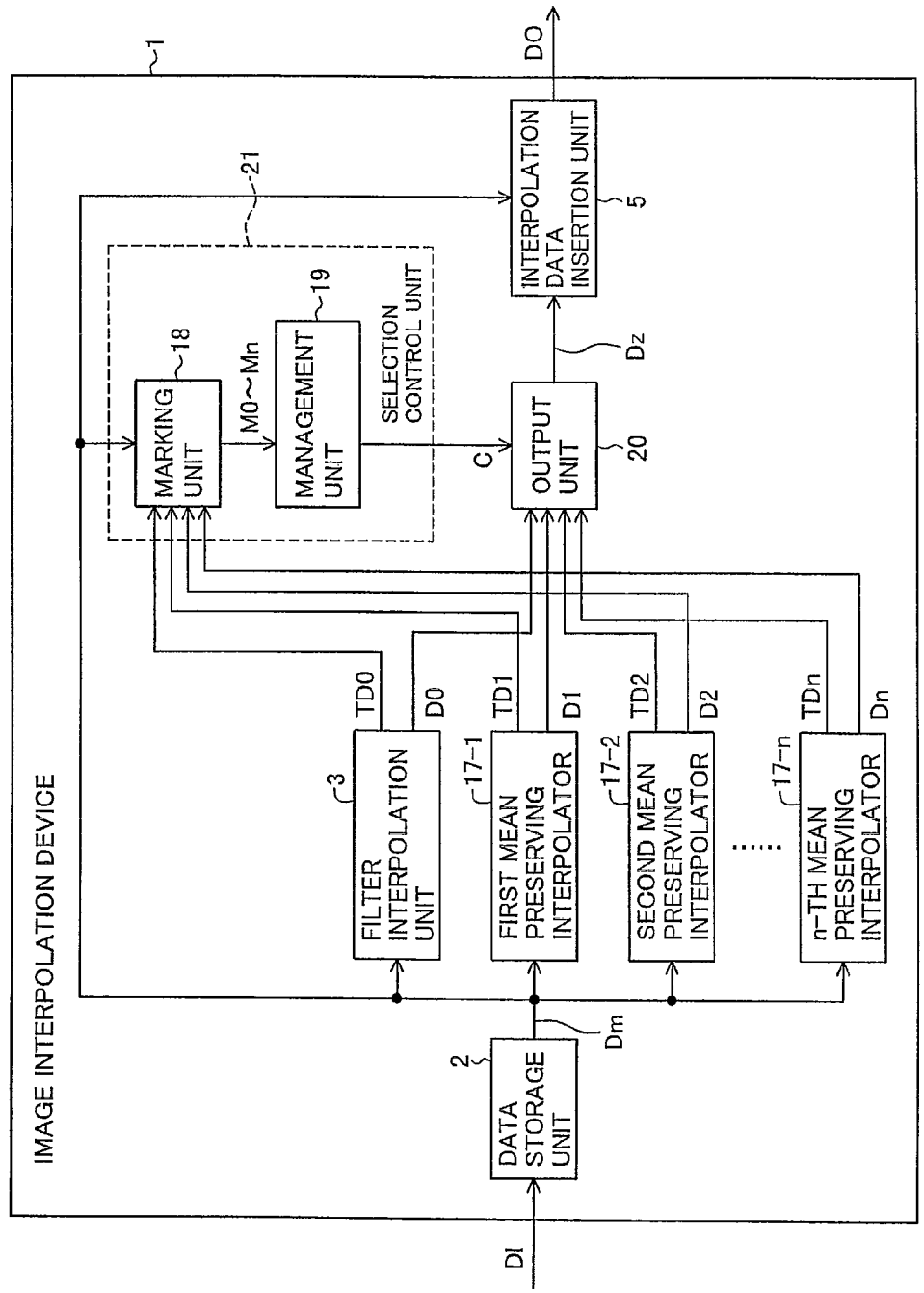
FIG. 20 illustrates the structure of an image interpolation device in a second embodiment of the invention.

FIG. 20 is a drawing showing the structure of an image interpolation device in a second embodiment of the invention. The image interpolation device in the second embodiment of the invention has a data storage unit 2, a filter interpolation unit 3, an interpolation data insertion unit 5, a first mean preserving interpolator 17-1, a second mean preserving interpolator 17-2, . . . , an n-th mean preserving interpolator 17-n, an output unit 20, and a selection control unit 21. The selection control unit 21 has a marking unit 18 and a management unit 19.

Image data DI are input to the data storage unit 2, which stores a certain interval of data by using flip-flops or the like, and outputs the certain interval of data Dm. The data Dm are input to the filter interpolation unit 3, the first mean preserving interpolator 17-1, the second mean preserving interpolator 17-2, . . . the n-th mean preserving interpolator 17-n, and the marking unit 18.

The filter interpolation unit 3 outputs test interpolation data TD0 and candidate interpolation data D0, based on data Dm. Test interpolation data TD0 are input to the marking unit 18 while candidate interpolation data D0 are input to the output unit 20. The first mean preserving interpolator 17-1 outputs test interpolation data TD1 and candidate interpolation data D1, based on data Dm, the second mean preserving interpolator 17-2 outputs test interpolation data TD2 and candidate interpolation data D2, based on data Dm, and the n-th mean preserving interpolator 17-n outputs test interpolation data TDn and candidate interpolation data Dn, based on data Dm. The test interpolation data TD1, TD2, TDn are input to the marking unit 18 while candidate interpolation data D1, D2, Dn are input to the output unit 20.

The marking unit 18 marks test interpolation data TD0 to TDn, using corresponding data Dm, and outputs marking data M0 to Mn. The marking data M0 to Mn are input to the management unit 19. The management unit 19 selects candidate interpolation data based on the marking data M0 to Mn and outputs a selection signal C. The selection signal C is input to the output unit 20. Based on the selection signal C, the output unit 20 selects data Dz from among the candidate interpolation data D0 to Dn, and outputs data Dz. Data Dz are input to the interpolation data insertion unit 5. The interpolation data insertion unit 5 outputs data that have data Dz inserted into the data Dm, as data DO.

The mean preserving interpolators 17-1 to 17-n will now be described.

Figure 21:
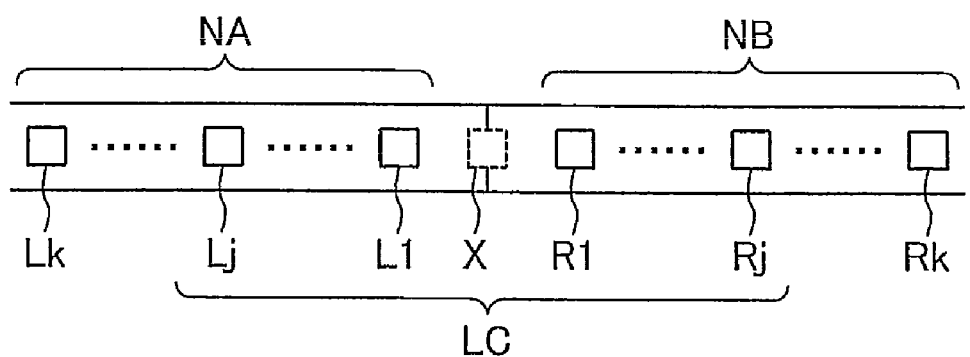
FIG. 21 is a drawing illustrating the operation of mean preserving interpolators.

FIG. 21 is a drawing illustrating the operation of the mean preserving interpolators. The mean preserving interpolators 17-1 to 17-n calculate data for the missing pixel X so that the mean value of the pixel row LC including the missing pixel X and the mean values of the pixel rows NA and NB excluding the missing pixel X become equal. More precisely, with the value of the missing pixel as an unknown value X, the mean preserving interpolators 17-1 to 17-n calculate the value of the missing pixel so as to make the mean value of the pixels in a first group consisting of pixels in a neighborhood of the missing pixel (pixels belonging to pixel row LC), and the mean value of the pixels in a second group consisting of the pixels located in the neighborhood of the missing pixel but excluding the missing pixel (pixels belonging to pixel rows NA and NB) equal. In other words, they calculate X to satisfy the following equation:

$$(L1+\ldots+Lj+X+R1+\ldots+Rj)/k=((L1+\ldots+Lk)/k+(R1+\ldots+Rk)/k)/2$$

where j is a positive integer.

In this equation, k is the number of pixels in the pixel row NA; the value of k differs among the plurality of mean preserving interpolators 17-1 to 17-n. For example, k=2 in the first mean preserving interpolator 17-1, k=3 in the second mean preserving interpolator 17-2, and k=n+1 in the n-th mean preserving interpolator 17-n.

The relationship between j and k is expressed as follows:

$$2j+1=k,$$

that is, $$j=(k-1)/2$$

Next, an explanation will be given using a specific example.

Figure 22:
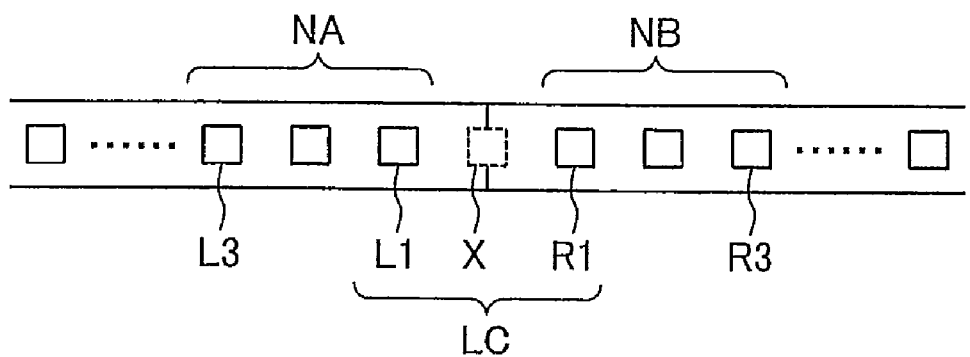
FIG. 22 is a drawing illustrating the operation of the mean preserving interpolators when k=3.

FIG. 22 is a drawing illustrating the operation of the mean preserving interpolator 17-2. The mean preserving interpolator 17-2 calculates data for the missing pixel X so as to make the mean value of pixel row LC, including the missing pixel X, equal to the mean value of pixel rows NA and NB, excluding the missing pixel X. That is, $$(L1+X+R1)/3=((L1+L2+L3)/3+(R1+R2+R3)/3)/2$$

from which it follows that $$X=((-L1+L2+L3)+(-R1+R2+R3))/2$$

Figure 23:
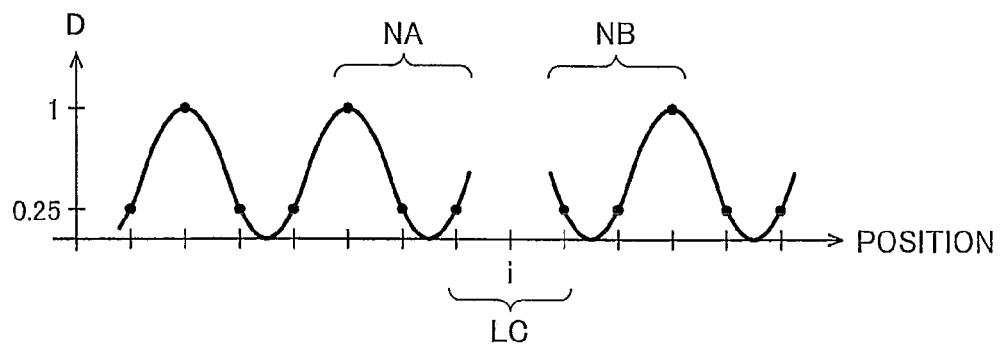
FIG. 23 is a drawing illustrating reference intervals used for processing data with a three-pixel period using the mean preserving interpolators with k=3.

FIG. 23 is a drawing illustrating reference intervals used for processing data with a three-pixel period using the mean preserving interpolators when k=3. The horizontal axis represents position while the vertical axis represents data. When data at position i are processed as the missing pixel X, positions i−1, i and i+1 constitute the pixel row LC including the missing pixel, positions i−3, i−2 and i−1 constitute pixel row NA excluding the missing pixel, and positions i+1, i+2 and i+3 constitute pixel row NB excluding the missing pixel.

Since $$D(i-3)=1, D(i-1)=0.25, D(i-1)=0.25,$$

$$D(i+1)=0.25, D(i+2)=0.25, D(i+3)=1,$$

it follows that $$\begin{aligned}X &= ((-L1+L2+L3)+(-R1+R2+R3))/2\\ &= \left(\begin{array}{c}(-D(i-1)+D(i-2)+D(i-3))+\\(-D(i+1)+D(i+2)+D(i+3))\end{array}\right)/2\\ &= ((-0.25+0.25+1)+(-0.25+0.25+1))/2\\ &= 1\end{aligned}$$

Figure 24:
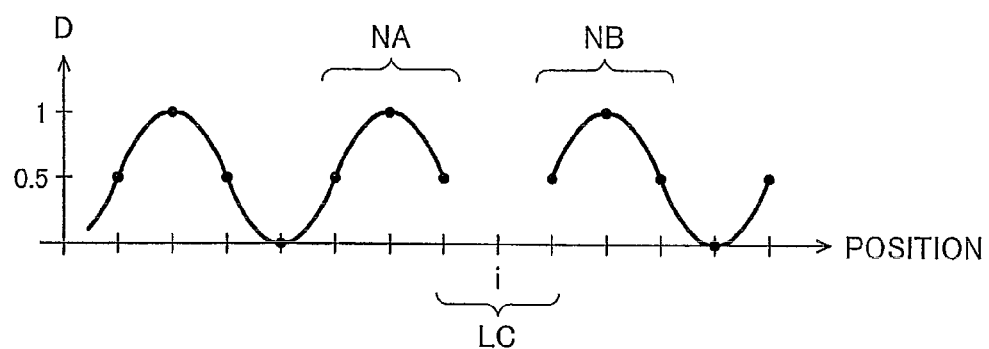
FIG. 24 is a drawing illustrating reference intervals used for processing data with a four-pixel period using the mean preserving interpolators with k=3.

FIG. 24 is a drawing illustrating the reference intervals used for processing data with a four-pixel period using the mean preserving interpolators when k=3. The horizontal axis represents position while the vertical axis represents data. When the data at position i are processed as the missing pixel X, positions i−1, i and i+1 constitute the pixel row LC including the missing pixel, positions i−3, i−2 and i−1 constitute pixel row NA excluding the missing pixel, and positions i+1, i+2 and i+3 constitute pixel row NB excluding the missing pixel.

Since $$D(i-3)=0.5, D(i-1)=1, D(i-1)=0.5,$$

$$D(i+1)=0.5, D(i+2)=1, D(i+3)=0.5$$

it follows that $$\begin{aligned} X &= ((-L1 + L2 + L3) + (-R1 + R2 + R3))/2 \\ &= \left( \begin{array}{c} (-D(i-1) + D(i-2) + D(i-3)) + \\ (-D(i+1) + D(i+2) + D(i+3)) \end{array} \right) \Big/ 2 \\ &= ((-0.5 + 1 + 0.5) + (-0.5 + 1 + 0.5))/2 \\ &= 1 \end{aligned}$$

For the data with a three-pixel period, the expected data value at position i is 1 and the mean preserving interpolator 17-2 with k=3 calculates the correct interpolated data, but for the data with a four-pixel period, the expected data value at position i is 0 and the mean preserving interpolator 17-2 with k=3 does not calculate the correct interpolated data. The period of the changes in pixel value (the spatial frequency) for which mean preserving interpolator 17-2 can interpolate properly thus differs according to the value of k. In other words, the value of k in the mean preserving interpolators 17-1 to 17-n (the number of pixels in the pixel row LC) is determined according to the spatial frequency of the changes in pixel value for which proper (accurate) interpolation is expected.

The operation of the marking unit 18 will now be described.

The marking unit 18 assigns marks based on the test interpolation data TD0 to TDn and the data Dm obtained from the storage unit.

Test interpolation data TD0 are calculated by the filter interpolation unit 3 for non-missing pixels in the vicinity of the missing pixel, and test interpolation data TD1 to TDn are calculated by the mean preserving interpolators 17-1 to 17-n.

Figure 25:
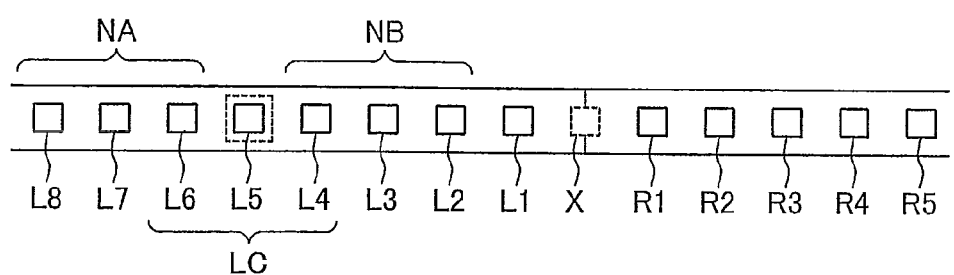
FIG. 25 is a drawing showing the positional relationship of a test interpolation pixel and the missing pixel.

FIG. 25 is a drawing showing the positional relationship of a test interpolation pixel and the missing pixel. The test interpolation pixel is defined in the vicinity of the missing pixel; the filter interpolation unit 3 and the mean preserving interpolators 17-1 to 17-n use the defined test interpolation pixel as a virtual missing pixel, and calculate interpolation data by interpolating in the same manner as they would in interpolation of the missing pixel, to create test interpolation data. The marking unit 18 outputs the difference between the test interpolation data TD0 to TD and the actual value of the test interpolation pixel (the value stored in the data storage unit 2) as marking data representing the interpolation error.

For example, when L5 is set as a test interpolation pixel and test interpolation data are calculated using the mean preserving interpolator 17-2 with k=3, L4 to L6 are defined as pixel row LC including the missing pixel, L6 to L8 are defined as pixel row NA excluding the missing pixel, L2 to L4 are defined as pixel row NB excluding the missing pixel, and interpolation data at the position of L5 are calculated.

The operation of the management unit 19 will now be described.

Figures 26, 27:
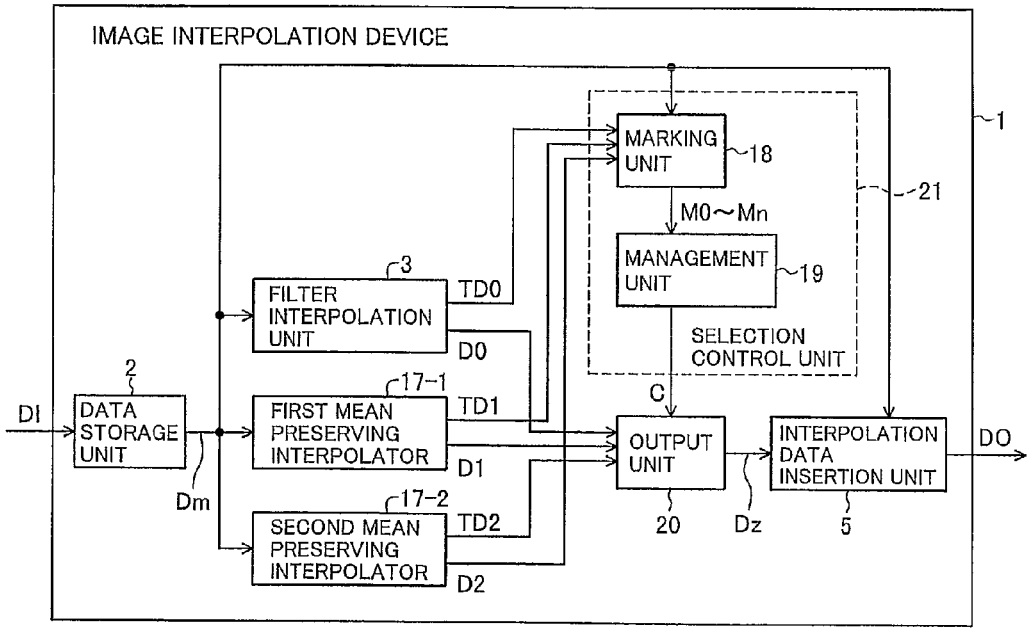
FIG. 26 is a drawing showing the relationships between test interpolation pixels T1 to Tm and marking data M0 to Mn of the filter interpolators, the first mean preserving interpolators, the second mean preserving interpolators and the n-th mean preserving interpolators.
FIG. 27 is a drawing showing the structure of an image interpolation device comprising an interpolation means, a filter interpolator, a first mean preserving interpolator and a second mean preserving interpolator in a second embodiment of the invention.

FIG. 26 is a drawing showing the relationships between test interpolation pixels T1 to Tm and the marking data M0 to Mn of the filter interpolator 3, the first mean preserving interpolator 17-1, the second mean preserving interpolator 17-2, and the n-th mean preserving interpolator 17-n. When a plurality of test interpolation pixels are defined in the vicinity of the missing pixel, marking data M0[T1] to M0[Tm] of the filter interpolation unit 3 are calculated by the marking unit 3. Marking data M1 to Mn of the first mean preserving interpolator 17-1 to the nth mean preserving interpolator 17-n are similarly calculated.

The management unit 19 adds up the marking data of the filter interpolation unit to calculate score data S0. The value of the score data S(0) is the sum of the marking data M0[T1] to M0[Tm]. That is:

$$S0 = M0[T1] + M0[T2] + \ldots + M0[Tm]$$

Similarly, the score data S1 to Sn of the first mean preserving interpolator 17-1 to the n-th mean preserving interpolator 17-n are as follows:

$$S1 = M1[T1] + M1[T2] + \ldots + M1[Tm]$$

$$S2 = M2[T1] + M2[T2] + \ldots + M2[Tm]$$

$$\ldots$$

$$Sn = Mn[T1] + Mn[T2] + \ldots + Mn[Tm]$$

The missing pixel is interpolated by the interpolation method having the score data with the smallest value, that is, the method having the least interpolation error in the vicinity of the missing pixel (the least sum of the interpolation errors for the plurality of test interpolation pixels in the vicinity of the missing pixel). The management unit 19 selects the score data with the smallest value from the score data S0 to Sn, and outputs a selection signal C indicating the interpolation method having the score data with the smallest value.

The operation of the image interpolation device in the second embodiment of the invention will now be described using a specific example.

FIG. 27 is a drawing showing the structure of an image interpolation device in the second embodiment of the invention having a filter interpolator 3, a first mean preserving interpolator 17-1, and a second mean preserving interpolator 17-2 as interpolation means.

The first mean preserving interpolator 17-1, which is the mean preserving interpolator for k=2, calculates missing pixel data such that the mean value of three pixels including the missing pixel and the mean value of three pixels excluding the missing pixel are equal.

The second mean preserving interpolator 17-2, which is the mean preserving interpolator for k=3, calculates missing pixel data such that the mean value of two pixels including the missing pixel and the mean value of two pixels excluding the missing pixel are equal.

FIG. 28 is a drawing showing exemplary positional relationships of test interpolation pixels and the missing pixel in the specific example. To the left of the missing pixel X, pixel L6 is T1 and L5 is T2; to the right of the missing pixel, pixel R5 is T3 and R6 is T4.

Interpolation of data with a four-pixel period using the image interpolation device shown in FIG. 27 will now be described.

FIG. 29 is a drawing showing data with a four-pixel period, into which a pixel is to be interpolated at position i. Position i−6 is T1, i−5 is T2, i+5 is T3, and i+6 is T4.

The filter interpolation unit 3 outputs test interpolation data TD0 for T1 to T4 and candidate interpolation data D0 for position i. The following explanation assumes that the coefficient storage unit 7 of the filter interpolation unit 3 stores the coefficients shown in FIG. 13. Since $$DI(i-10)=1, DI(i-9)=0.5, DI(i-8)=0,$$

$$DI(i-7)=0.5, DI(i-6)=1, DI(i-5)=0.5,$$

$$DI(i-4)=0, DI(i-3)=0.5, DI(i-2)=1,$$

$$DI(i-1)=0.5, DI(i+1)=0.5, DI(i+2)=1,$$

$$DI(i+3)=0.5, DI(i+4)=0, DI(i+5)=0.5,$$

$$DI(i+6)=1, DI(I-7)=0.5, DI(i+8)=0,$$

$$DI(i+9)=0.5, DI(i+10)=1$$

the test interpolation data TD0[T1] to TD0[T4] are:

$$\begin{aligned}TD0[T1] = &-0.058\times 1 + 0.241\times 0.5 - 0.553\times 0 + 0.870\times\\ & 0.5 + 0.870\times 0.5 - 0.553\times 0 + 0.241\times 0.5 - 0.058\times 1\\ = & 0.995\end{aligned}$$

$$\begin{aligned}TD0[T2] = &-0.058\times 0.5 + 0.241\times 0 - 0.553\times 0.5 + 0.870\times\\ & 1 + 0.870\times 0 - 0.553\times 0.5 + 0.241\times 1 - 0.058\times 0.5\\ = & 0.5\end{aligned}$$

$$\begin{aligned}TD0[T3] = &-0.058\times 0.5 + 0.241\times 1 - 0.553\times 0.5 + 0.870\times\\ & 0 + 0.870\times 1 - 0.553\times 0.5 + 0.241\times 0 - 0.058\times 0.5\\ = & 0.5\end{aligned}$$

$$\begin{aligned}TD0[T4] = &-0.058\times 1 + 0.241\times 0.5 - 0.553\times 0 + 0.870\times\\ & 0.5 + 0.870\times 0.5 - 0.553\times 0 + 0.241\times 0.5 - 0.058\times 1\\ = & 0.995\end{aligned}$$

The candidate interpolation data D0 is:

$$\begin{aligned}D0 = &-0.058\times 0 + 0.241\times 0.5 - 0.553\times 1 + 0.870\times\\ & 0.5 + 0.870\times 0.5 - 0.553\times 1 + 0.241\times 0.5 - 0.058\times 0\\ = & 0.005\end{aligned}$$

The first mean preserving interpolator 17-1 outputs test interpolation data TD1 for T1 to T4 and candidate interpolation data D1 for position i. The test interpolation data TD1[T1] to TD1[T4] are:

$$TD1[T1]=(0+0.5+0-0.5)/2=0$$

$$TD1[T2]=(0.5+1+0.5-0)/2=1$$

$$TD1[T3]=(0.5+0+0.5-1)/2=0$$

$$TD1[T4]=(0+0.5+0-0.5)/2=0$$

The value of candidate interpolation data D1 is:

$$D1=(1+0.5+1-0.5)/2=1$$

The second mean preserving interpolator 17-2 outputs test interpolation data TD2 for T1 to T4 and candidate interpolation data D2 for position i. The test interpolation data TD2[T1] to TD2[T4] are:

$$TD2[T1]=(0.5+0+0+0.5-0.5-0.5)/2=0$$

$$TD2[T2]=(0+0.5+0.5+1-1-0)/2=0.5$$

$$TD2[T3]=(1+0.5+0.5+0-0-1)/2=0.5$$

$$TD2[T4]=(0.5+0+0+0.5-0.5-0.5)/2=0$$

The value of candidate interpolation data D2 is:

$$D2=(0.5+1+1+0.5-0.5-0.5)/2=1$$

FIG. 30 is a table of the marking data output by the marking unit 18 and the score data managed by the management unit 19. The marking data M0[T1] to M0[T4] of the filter interpolation unit 3 are:

$$M0[T1]=|TD0[T1]-DI(i-6)|=|0.995-1|=0.005$$

$$M0[T2]=|TD0[T2]-DI(i-5)|=|0.5-0.5|=0$$

$$M0[T3]=|TD0[T3]-DI(i+5)|=|0.5-0.5|=0$$

$$M0[T4]=|TD0[T4]-DI(i+6)|=|0.995-1|=0.005$$

Therefore, the value of score data S0 is:

$$\begin{aligned}S0 &= M0[T1] + M0[T2] + M0[T3] + M0[T4]\\ &= 0.005 + 0 + 0 + 0.005\\ &= 0.01\end{aligned}$$

The marking data M1[T1] to M1[T4] of the first mean preserving interpolator 17-1 are:

$$M1[T1]=|TD1[T1]-DI(i-6)|=|0-1|=1$$

$$M1[T2]=|TD1[T2]-DI(i-5)|=|1-0.5|=0.5$$

$$M1[T3]=|TD1[T3]-DI(i+5)|=|0-0.5|=0.5$$

$$M1[T4]=|TD1[T4]-DI(i+6)|=|0-1|=1$$

Therefore, the value of score data S1 is:

$$\begin{aligned}S1 &= M1[T1] + M1[T2] + M1[T3] + M1[T4]\\ &= 1 + 0.5 + 0.5 + 1\\ &= 3\end{aligned}$$

The marking data M2[T1] to M2[T4] of the second mean preserving interpolator 17-2 are:

$$M2[T1]=|TD2[T1]-DI(i-6)|=|0-1|=1$$

$$M2[T2]=|TD1[T2]-DI(i-5)|=|0.5-0.5|=0$$

$$M2[T3]=|TD1[T3]-DI(i+5)|=|0.5-0.5|=0$$

$$M2[T4]=|TD1[T4]-DI(i+6)|=|0-1|=1$$

Therefore, the value of score data S1 is:

$$\begin{aligned}S2 &= M2[T1] + M2[T2] + M2[T3] + M2[T4]\\ &= 1 + 0 + 0 + 1\\ &= 2\end{aligned}$$

The management unit 19 selects the filter interpolation unit 3 as having the score data with the smallest value, and outputs a selection signal C indicating that the candidate interpolation data D0 output by the filter interpolation unit 3 are selected.

Based on the selection signal C, the output unit 20 outputs the candidate interpolation data D0=0 output by the filter interpolation unit 3 as data Dz.

The interpolation data insertion unit 5 outputs data DO that have data Dz=0 interpolated at position i. Since the expected value at position i is 0, among the candidate interpolation data D0=0, D1=1, and D2=1, candidate interpolation data D0 have the smallest interpolation error.

The interpolation of data with a three-pixel period using the image interpolation device in FIG. 27 will now be described.

FIG. 31 is a drawing showing data with a three-pixel period, into which a pixel is to be interpolated at position i. Position I−6 is T1, I−5 is T2, i+5 is T3, and i+6 is T4.

The filter interpolation unit 3 outputs test interpolation data TD0 for T1 to T4 and candidate interpolation data D0 for position i. The following explanation assumes that the coefficient storage unit 7 of the filter interpolation unit 3 stores the coefficients shown in FIG. 13. Since $$DI(i-10)=0.75, D(i-9)=0, DI(i-8)=0.75,$$

$$DI(i-7)=0.75, DI(i-6)=0, DI(i-5)=0.75,$$

$$DI(i-4)=0.75, DI(i-3)=0, DI(i-2)=0.75,$$

$$DI(i-1)=0.75, D(i+1)=0.75, DI(i+2)=0.75,$$

$$DI(i+3)=0, DI(i+4)=0.75, DI(i+5)=0.75,$$

$$DI(i+6)=0, DI(i+7)=0.75, DI(i+8)=0.75,$$

$$DI(i+9)=0, DI(i+10)=0.75,$$

the test interpolation data TD0[T1] to TD0[T4] are:

$$\begin{aligned}TD0[T1] = &-0.058 \times 0.75 + 0.241 \times 0 - 0.553 \times 0.75 + 0.870 \times \\ &0.75 + 0.870 \times 0.75 - 0.553 \times 0.75 + 0.241 \times 0 - \\ &0.058 \times 0.75 \\ = &\, 0.3885\end{aligned}$$

$$\begin{aligned}TD0[T2] = &-0.058 \times 0 + 0.241 \times 0.75 - 0.553 \times 0.75 + 0.870 \times 0 + \\ &0.870 \times 0.75 - 0.553 \times 0 + 0.241 \times 0.75 - 0.058 \times 0.75 \\ = &\, 0.55575\end{aligned}$$

$$\begin{aligned}TD0[T3] = &-0.058 \times 0.75 + 0.241 \times 0.75 - 0.553 \times 0 + 0.870 \times \\ &0.75 + 0.870 \times 0 - 0.553 \times 0.75 + 0.241 \times 0.75 - \\ &0.057 \times 0 \\ = &\, 0.55575\end{aligned}$$

$$\begin{aligned}TD0[T4] = &-0.058 \times 0.75 + 0.241 \times 0 - 0.553 \times 0.75 + 0.870 \times \\ &0.75 + 0.870 \times 0.75 - 0.553 \times 0.75 + 0.241 \times 0 - 0.058 \times \\ &0.750 \\ = &\, 0.3885\end{aligned}$$

The value of candidate interpolation data D0 is:

$$\begin{aligned}D0 = &-0.058 \times 0.75 + 0.241 \times 0 - 0.553 \times +.75 + 0.870 \times 0.75 + \\ &0.870 \times 0.75 - 0.553 \times 0.75 + 0.241 \times 0 - 0.058 \times 0.75 \\ = &\, 0.3885\end{aligned}$$

The first mean preserving interpolator 17-1 outputs test interpolation data TD1 for T1 to T4 and candidate interpolation data D1 for position i. The test interpolation data TD1[T1] to TD1[T4] are:

$$TD1[T1]=(0.75+0.75+0.75-0.75)/2=0.75$$

$$TD1[T2]=(0.75+0+0-0.75)/2=0$$

$$TD1[T3]=(0+0.75+0.75-0)/2=0.75$$

$$TD1[T4]=(0.75+0.75+0.75-0.75)/2=0.75$$

The value of candidate interpolation data D1 is:

$$D1=(0.75+0.75+0.75-0.75)/2=0.75$$

The second mean preserving interpolator 17-2 outputs test interpolation data TD2 for T1 to T4 and candidate interpolation data D2 for position i. The test interpolation data TD2[T1] to TD2[T4] are:

$$TD2[T1]=(0+0.75+0.75+0-0.75-0.75)/2=0$$

$$TD2[T2]=(0.75+0.75+0+0.75-0-0.75)/2=0.75$$

$$TD2[T3]=(0.75+0+0.75+0.75-0.75-0)/2=0.75$$

$$TD2[T4]=(0+0.75+0.75+0-0.75-0.75)/2=0$$

The value of candidate interpolation data D2 is:

$$D2=(0+0.75+0.75+0-0.75-0.75)/2=0$$

Figures 32, 33, 34:
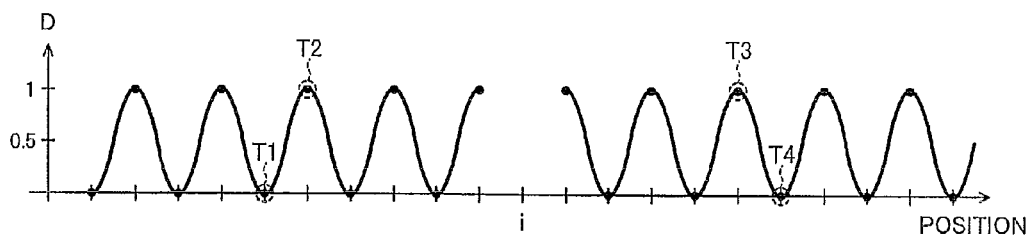
FIG. 32 is a table of the marking data output by the marking unit and the score data managed by the management unit.
FIG. 33 is a drawing showing data with a two-pixel period, into which a pixel is interpolated at position i.
FIG. 34 is a table of the marking data output by the marking unit and the score data managed by the management unit.

FIG. 32 is a table of the marking data output by the marking unit 18 and the score data managed by the management unit 19. The marking data M0[T1] to M0[T4] of the filter interpolation unit 3 are:

$$\begin{aligned}M0[T1] &= |TD0[T1] - DI(i-6)| \\ &= |0.3885 - 0| \\ &= 0.3885\end{aligned}$$

$$\begin{aligned}M0[T2] &= |TD0[T2] - DI(i-5)| \\ &= |0.55575 - 0.75| \\ &= 0.19425\end{aligned}$$

$$\begin{aligned}M0[T3] &= |TD0[T3] - DI(i+5)| \\ &= |0.55575 - 0.75| \\ &= 0.19425\end{aligned}$$

$$\begin{aligned}M0[T4] &= |TD0[T4] - DI(i+6)| \\ &= |0.3885 - 0| \\ &= 0.3885\end{aligned}$$

Therefore, the value of score data S0 is:

$$\begin{aligned}S0 &= M0[T1] + M0[T2] + M0[T3] + M0[T4] \\ &= 0.3885 + 0.19425 + 0.19425 + 0.3885 \\ &= 1.1655\end{aligned}$$

The marking data M1[T1] to M1[T4] of the first mean preserving interpolator 17-1 are:

$$M1[T1] = |TD1[T1] - DI(i-6)|$$
$$= |0.75 - 0|$$
$$= 0.75$$

$$M1[T2] = |TD1[T2] - DI(i-5)|$$
$$= |0. - 0.75|$$
$$= 0.75$$

$$M1[T3] = |TD1[T3] - DI(i+5)|$$
$$= |0.75 - 0.75|$$
$$= 0$$

$$M1[T4] = |TD1[T4] - DI(i+6)|$$
$$= |0.75 - 0|$$
$$= 0.75$$

Therefore, the value of score data S1 is:

$$S1 = M1[T1] + M1[T2] + M1[T3] + M1[T4]$$
$$= 0.75 + 0.75 + 0 + 0.75$$
$$= 2.25$$

The marking data M2[T1] to M2[T4] of the second mean preserving interpolator 17-2 are:

$$M2[T1]=|TD2[T1]-DI(i-6)|=|0-0|=0$$

$$M2[T2]=|TD1[T2]-DI(i-5)|=|0.75-0.75|=0$$

$$M2[T3]=|TD1[T3]-DI(i+5)|=|0.75-0.75|=0$$

$$M2[T4]=|TD1[T4]-DI(i+6)|=|0-0|=0$$

Therefore, the value of score data S1 is:

$$S2 = M2[T1] + M2[T2] + M2[T3] + M2[T4]$$
$$= 0 + 0 + 0 + 0$$
$$= 0$$

The management unit 19 selects the second mean preserving interpolator 17-2, which has the score data with the smallest value, and outputs a selection signal C indicating that the candidate interpolation data D2 output by the second mean preserving interpolator 17-2 are selected.

Based on the selection signal C, the output unit 20 outputs the candidate interpolation data D2=0 output by the second mean preserving interpolator 17-2 as data Dz.

The interpolation data insertion unit 5 outputs data DO that have data Dz=0 interpolated at position i. Since the expected value at position i is 0, among the candidate interpolation data D0=0.3885, D1=0.75, and D2=0, candidate interpolation data D2 have the smallest interpolation error.

The interpolation of data with a two-pixel period using the image interpolation device in FIG. 27 will now be described.

FIG. 33 is a drawing showing data with a two-pixel period, into which a pixel is to be interpolated at position i. Position i−6 is T1, i−5 is T1, i+6 is T3 and i+6 is T4.

The filter interpolation unit 3 outputs test interpolation data TD0 for T1 to T4 and candidate interpolation data D0 for position i. The following explanation assumes that the coefficient storage unit 7 of the filter interpolation unit 3 stores the coefficients shown in FIG. 13. Since $DI(i-10)=0$, $D(i-9)=1$, $DI(i-8)=0$, $DI(i-7)=1$, $DI(i-6)=0$, $DI(i-5)=1$, $DI(i-4)=0$, $DI(i-3)=1$, $DI(i-2)=0$, $DI(i-1)=1$, $D(i+1)=1$, $DI(i+2)=0$, $DI(i+3)=1$, $DI(i+4)=0$, $DI(i+5)=1$, $DI(i+6)=0$, $DI(i+7)=1$, $DI(i+8)=0$, $DI(i+9)=1$, $DI(i+10)=0$, the test interpolation TD0[T1] to TD0[T4] are:

$$TD0[T1] = -0.058 \times 0 + 0.241 \times 1 - 0.553 \times 0 + 0.870 \times 1 +$$
$$0.870 \times 1 - 0.553 \times 0 + 0.241 \times 1 - 0.058 \times 0$$
$$= 2.222$$

$$TD0[T2] = -0.058 \times 1 + 0.241 \times 0 - 0.553 \times 1 + 0.870 \times 0 +$$
$$0.870 \times 0 - 0.553 \times 1 + 0.241 \times 0 - 0.058 \times 1$$
$$= -1.222$$

$$TD0[T3] = -0.058 \times 1 + 0.241 \times 0 - 0.553 \times 1 + 0.870 \times 0 +$$
$$0.870 \times 0 - 0.553 \times 1 + 0.241 \times 0 - 0.058 \times 1$$
$$= -1.222$$

$$TD0[T4] = -0.058 \times 0 + 0.241 \times 1 - 0.553 \times 0 + 0.870 \times 1 +$$
$$0.870 \times 1 - 0.553 \times 0 + 0.241 \times 1 - 0.058 \times 0$$
$$= 2.222$$

The value of candidate interpolation data D0 is:

$$D0 = -0.058 \times 0 + 0.241 \times 1 - 0.553 \times 0 + 0.870 \times 1 +$$
$$0.870 \times 1 - 0.553 \times 0 + 0.241 \times 1 - 0.058 \times 0$$
$$= 2.222$$

The first mean preserving interpolator 17-1 outputs test interpolation data TD1 for T1 to T4 and candidate interpolation data D1 for position i. The test interpolation data TD1[T1] to TD1[T4] are:

$$TD1[T1]=(0+1+0-1)/2=0$$

$$TD1[T2]=(1+0+1-0)/2=1$$

$$TD1[T3]=(1+0+1-0)/2=1$$

$$TD1[T4]=(0+1+0-1)/2=0$$

The value of candidate interpolation data D1 is:

$$D1=(0+1+0-1)/2=0$$

The second mean preserving interpolator 17-2 outputs test interpolation data TD2 for T1 to T4 and candidate interpolation data D2 for position i. The test interpolation data TD2[T1] to TD2[T4] are:

$$TD2[T1]=(1+0+0+1-1-1)/2=0$$

$$TD2[T2]=(0+1+1+0-0-0)/2=1$$

$$TD2[T3]=(0+1+1+0-0-0)/2=1$$

$$TD2[T4]=(1+0+0+1-1-1)/2=0$$

The value of candidate interpolation data D1 is:

$$D1=(1+0+0+1-1-1)/2=0$$

FIG. 34 is a table of the marking data output by the marking unit 18 and the score data managed by the management unit 19. The marking data M0[T1] to M0[T4] of the filter interpolation unit 3 are:

$$M0[T1] = |TD0[T1] - DI(i-6)|$$
$$= |2.222 - 0|$$
$$= 2.222$$

$$M0[T2] = |TD0[T2] - DI(i-5)|$$
$$= |-1.222 - 1|$$
$$= 2.222$$

$$M0[T3] = |TD0[T3] - DI(i+5)|$$
$$= |-1.222 - 1|$$
$$= 2.222$$

$$M0[T4] = |TD0[T4] - DI(i+6)|$$
$$= |2.222 - 0|$$
$$= 2.222$$

Therefore, the value of score data S0 is:

$$S0 = M0[T1] + M0[T2] + M0[T3] + M0[T4]$$
$$= 2.222 + 2.222 + 2.222 + 2.222$$
$$= 8.888$$

The marking data M1[T1] to M1[T4] of the first mean preserving interpolator 17-1 are:

$$M1[T1]=|TD1[T1]DI(i-6)|=|0-0|=0$$

$$M1[T2]=|TD1[T2]-DI(i-5)|=|1-1|=0$$

$$M1[T3]=|TD1[T3]-DI(i+5)|=|1-1|=0$$

$$M1[T4]=|TD1[T4]-DI(i+6)|=|0-0|=0$$

Therefore, the value of score data S1 is:

$$S1 = M1[T1] + M1[T2] + M1[T3] + M1[T4]$$
$$= 0 + 0 + 0 + 0$$
$$= 0$$

The marking data M2[T1] to M2[T4] of the second mean preserving interpolator 17-2 are:

$$M2[T1]=|TD2[T1]-DI(i-6)|=|0-0|=0$$

$$M2[T2]=|TD1[T2]-DI(I-5)|=|1-1|=0$$

$$M2[T3]=|TD1[T3]-DI(i+5)|=|1-1|=0$$

$$M2[T4]=|TD1[T4]-DI(I-6)|=|0-0|=0$$

Therefore, the value of score data S2 is:

$$S2 = M2[T1] + M2[T2] + M2[T3] + M2[T4]$$
$$= 0 + 0 + 0 + 0$$
$$= 0$$

The management unit 19 selects the first mean preserving interpolator 17-2, which has the score data with the smallest value, and outputs a selection signal C indicating that the candidate interpolation data D1 output by the first mean preserving interpolator 17-2 are selected.

Based on the selection signal C, the output unit 20 outputs the candidate interpolation data D1=0 output by the first mean preserving interpolator 17-2 as data Dz.

The interpolation data insertion unit 5 outputs data DO that have data Dz=0 interpolated at position i. Since the expected value at position i is 0, among the candidate interpolation data D0=2.222, D1=0 and D2=0, candidate interpolation data D1 and D2 have less interpolation error than D0.

As described above, the selection control unit 21 comprising the marking unit 18 and the management unit 19 calculates, as interpolation error, the differences between the known values Dm of a plurality of pixels located in a vicinity of the missing pixel and test interpolation values TD0 to TDn calculated by the filter interpolation unit 3 and mean preserving interpolators 17-1 to 17-n for the test interpolation pixels in the same manner as used when they calculate interpolation values of the missing pixel, and selects, from among the filter interpolation unit 3 and the mean preserving interpolators 17-1 to 17-n, the one that has smallest total interpolation error for the plurality of test interpolation pixels; the output unit 20 outputs the interpolation value calculated for the missing pixel by the filter interpolation unit 3 or one of the mean preserving interpolators 17-1 to 17-n, as selected by the selection control unit 21, as interpolation data of the missing pixel; the interpolation data insertion unit 5 inserts the interpolation data output by the output unit 20 into the position corresponding to the missing pixel in the data output by the data storage unit 2.

As described above, the image interpolation device in FIG. 20 has mean preserving interpolators 17-1 to 17-n to interpolate data with high spatial frequencies that cannot be properly interpolated by the filter interpolation unit 3 (the filter interpolation unit 3 cannot perform appropriate (accurate) interpolation), and selects the optimal interpolation method for interpolating the missing pixel by marking test interpolation data generated by the interpolation methods using pixels in the vicinity of the missing pixel, so low-frequency data are interpolated by the filter interpolator while high-frequency data are interpolated by the mean preserving interpolators. As a result, proper interpolation results can be obtained over all frequencies.

The interpolation described above is performed by hardware, but the interpolation may also be performed by software or a combination of hardware and software.

Figure 35:
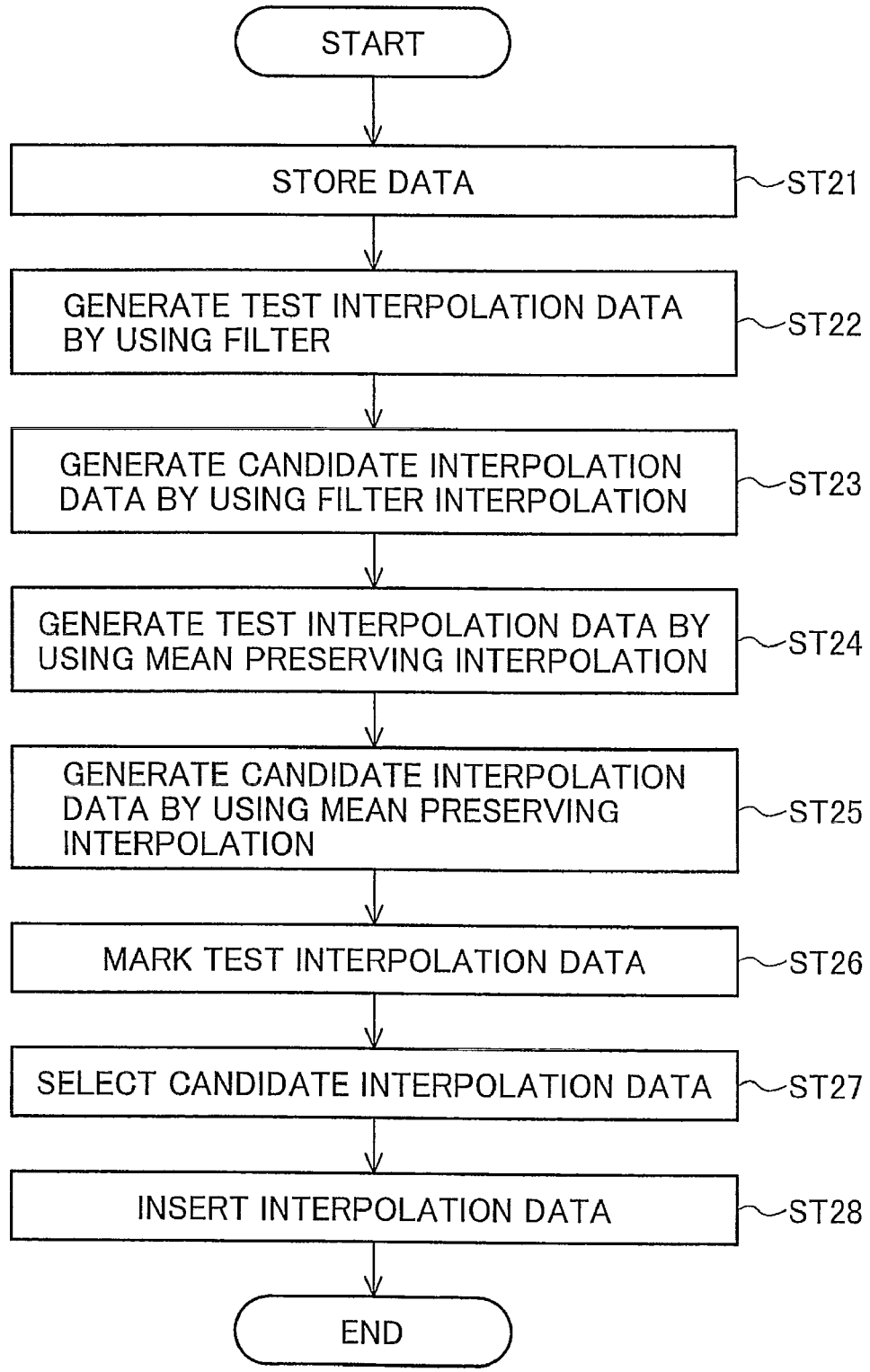
FIG. 35 is a flowchart illustrating operations performed by software processing.

FIG. 35 is a flowchart illustrating the processing procedure in this case.

In step ST21, data Dm in the vicinity of a missing pixel are stored.

In step ST22, test interpolation data TD0 are generated by filter interpolation.

In step ST23, candidate interpolation data D0 are generated by filter interpolation.

In step ST24, test interpolation data TD1 to TDn are generated by mean preserving interpolation.

In step ST25, candidate interpolation data D1 to Dn are generated by mean preserving interpolation.

In step ST26, test interpolation data TD0 to TDn are marked and marking data M0 to Mn are generated.

In step ST27, the interpolation data are selected based on the marking data M0 to Mn.

In step ST28, data D0 that have data Dz inserted at the position corresponding to the boundary in data Dm are generated.

The detailed processing at each step has been described with reference to FIG. 20, so explanations will be omitted here.

Industrial Applicability

The invention can be applied to contact image sensors such as copiers or scanners.

What is claimed is:

1. An image interpolation device for interpolating a missing pixel among a plurality of pixels arrayed in a line, wherein of the pixels aligned in the line, the pixels other than the missing pixel are mutually arrayed at a certain pitch, the pixels adjacent the missing pixel being mutually spaced apart by twice the certain pitch, the image interpolation device comprising:

a data storage unit for storing data representing pixel values of the plurality of pixels other than the missing pixel;

a filter interpolation unit for receiving data read from the data storage unit and performing a multiply-add operation by, from among the plurality of pixels arrayed in the line, multiplying the values of each of a plurality of neighboring pixels located in a neighborhood of the missing pixel by predetermined coefficients and adding resulting products, thereby calculating an interpolated value for the missing pixel;

a limit processing unit for limiting the data output from the filter interpolation unit to within a range of pixel values of the plurality of neighboring pixels; and an interpolation data insertion unit for inserting the data output from the limit processing unit into a position corresponding to the missing pixel in the data output from the data storage unit; and wherein in the filter interpolation unit, the values of the coefficients by which the pixel values of the neighboring pixels are multiplied are given by a product of $\{\sin(g \times d)\}/(g \times d)$ and a second prescribed constant, where d is the distance of the neighboring pixels from the missing pixel, and g is a first prescribed constant;

the coefficients are determined so that, except that the coefficient for the missing pixel is zero, the coefficients are proportional to coefficients used when the part of the filter interpolation unit that performs the multiply-add operation is a low-pass filter, and the sum of the coefficients is 1;

when the reciprocal of the pixel pitch is represented by Fs, the cutoff spatial frequency is represented by Fc, and the value of the distance from each neighboring pixel to the pixel being processed, represented as a number of pixel pitches, is represented by s, the distance d is given by $d=s/Fs$, the first prescribed constant g is given by $g=2\pi \times Fc$, and the second constant KS0 is given by $KS0=2Fc/Fs$.

2. The image interpolation device of claim 1, wherein when the input data of the limit processing unit are greater than a maximum value of the pixel values of the plurality of neighboring pixels, the limit processing unit outputs the maximum value as the output data corresponding to the input data, and when the input data are less than a minimum value of the pixel values of the plurality of neighboring pixels, the limit processing unit outputs the minimum value as the output data corresponding to the input data.

3. An image sensor comprising:

a light source for illuminating a document;

a sensor chip row having a plurality of sensor chips by which reflected light from the document undergoes photoelectric conversion and a signal corresponding to the reflected light is output, the sensor chips being arrayed in a line;

an A/D converter for converting the signal corresponding to the reflected light output from the sensor chip row to digital data; and the image interpolation device of claim 1, for receiving the digital data output from the A/D converter as input; wherein pixels are arrayed at the certain pitch in each of the plurality of sensor chips, the pixels at the ends of mutually adjacent sensor chips among the plurality of sensor chips constituting the pixels adjacent the missing pixel, and the process of calculating the interpolated value in the filter interpolation unit is carried out on missing pixels located between the pixels at the ends of the mutually adjacent sensor chips.

4. An image interpolation device for interpolating a missing pixel among a plurality of pixels arrayed in a line, wherein of the pixels aligned in the line, the pixels other than the missing pixel are mutually arrayed at a certain pitch, the pixels adjacent the missing pixel being mutually spaced apart by twice the certain pitch, the image interpolation device comprising:

a data storage unit for storing data representing pixel values of the plurality of pixels other than the missing pixel;

a filter interpolation unit for receiving data read from the data storage unit and performing a multiply-add operation by, from among the plurality of pixels arrayed in the line, multiplying the values of each of a plurality of neighboring pixels located in a neighborhood of the missing pixel by predetermined coefficients and adding resulting products, thereby calculating an interpolated value for the missing pixel;

a mean preserving interpolator for receiving data read from the data storage unit and calculating an interpolated value for the missing pixel such that a mean value of the pixel values of the pixels in a row of pixels including the missing pixel in the plurality of pixels arrayed in the line and a mean value of the pixel values of the pixels in a row of pixels excluding the missing pixel in the plurality of pixels arrayed in the line become equal;

a selection control unit for using each of a plurality of pixels having known pixel values and located in a vicinity of the missing pixel, in the plurality of pixels arrayed in the line, as a test interpolation pixel, determining, as interpolation differences, differences between the known value of the test interpolation pixel and test interpolation values calculated by the filter interpolation unit and the mean preserving interpolator by methods identical to methods used to determine the interpolated values for the missing pixel, and selecting the filter interpolation unit or the mean preserving interpolator, whichever has the minimum total interpolation difference value for the plurality of test interpolation pixels;

an output unit for outputting the interpolated value calculated for the missing pixel by the filter interpolation unit or the mean preserving interpolator, as selected by the selection control unit, as interpolation data for the missing pixel; and an interpolation data insertion unit for inserting the interpolation data output from the output unit into a position corresponding to the missing pixel in data output from the data storage unit; and wherein in the filter interpolation unit, the values of the coefficients by which the pixel values of the neighboring pixels are multiplied are given by a product of $\{\sin(g \times d)\}/(g \times d)$ and a second prescribed constant, where d is the distance of the neighboring pixels from the missing pixel, and g is a first prescribed constant;

the coefficients are determined so that, except that the coefficient for the missing pixel is zero, the coefficients are proportional to coefficients used when the part of the filter interpolation unit that performs the multiply-add operation is a low-pass filter, and the sum of the coefficients is 1;

when the reciprocal of the pixel pitch is represented by Fs, the cutoff spatial frequency is represented by Fc, and the value of the distance from each neighboring pixel to the pixel being processed, represented as a number of pixel pitches, is represented by s, the distance d is given by d=s/Fs, the first prescribed constant g is given by $g=2\pi \times Fc$, and the second constant KS0 is given by KS0=2Fc/Fs.

5. The image interpolation device of claim 4, wherein:

when calculating the interpolated value for the missing pixel, the mean preserving interpolator treats the value of the missing pixel as unknown and determines a pixel value of the missing pixel such that a mean value of a first group of pixels in the plurality of pixels arrayed in the line, including the missing pixel and pixels located in the neighborhood of the missing pixel, matches a mean value of a second group of pixels in the plurality of pixels arrayed in the line, including pixels located in the neighborhood of the missing pixel but excluding the missing pixel; and when calculating the interpolated value for the test interpolation pixel, instead of treating the value of the missing pixel as unknown, the mean preserving interpolator treats the value of the test interpolation pixel as unknown and determines a value of the test interpolation pixel such that the mean value of a third group of pixels in the plurality of pixels arrayed in the line, including the test interpolation pixel and pixels in a neighborhood of the test interpolation pixel, matches the mean value of a fourth group of pixels in the plurality of pixels arrayed in the line, including pixels located in the neighborhood of the test interpolation pixel but excluding the test interpolation pixel.

6. The image interpolation device of claim 5, wherein:

a plurality of mean preserving interpolators are provided; and the plurality of mean preserving interpolators each use different numbers of pixels in the first group, the second group, the third group, and the fourth group for their respective operations.

7. An image sensor comprising:

a light source for illuminating a document;

a sensor chip row having a plurality of sensor chips by which reflected light from the document undergoes photoelectric conversion and a signal corresponding to the reflected light is output, the sensor chips being arrayed in a line;

an A/D converter for converting the signal corresponding to the reflected light output from the sensor chip row to digital data; and the image interpolation device of claim 4, for receiving the digital data output from the A/D converter as input; wherein pixels are arrayed at the certain pitch in each of the plurality of sensor chips, the pixels at the ends of mutually adjacent sensor chips among the plurality of sensor chips constituting the pixels adjacent the missing pixel, and the process of calculating the interpolated value in the filter interpolation unit is carried out on missing pixels located between the pixels at the ends of the mutually adjacent sensor chips.

8. An image interpolation method for interpolating a missing pixel among a plurality of pixels arrayed in a line, wherein of the pixels aligned in the line, the pixels other than the missing pixel are mutually arrayed at a certain pitch, the pixels adjacent the missing pixel being mutually spaced apart by twice the certain pitch, the image interpolation method comprising:

a data storage step for storing data representing pixel values of the plurality of pixels other than the missing pixel;

a filter interpolation step for receiving data stored in the data storage step and performing a multiply-add operation by, from among the plurality of pixels arrayed in the line, multiplying the values of each of a plurality of neighboring pixels located in a neighborhood of the missing pixel by predetermined coefficients and adding resulting products, thereby calculating an interpolated value for the missing pixel;

a limit processing step for limiting the data output from the filter interpolation step to within a range of pixel values of the plurality of neighboring pixels; and an interpolation data insertion step for inserting the data output from the limit processing step into a position corresponding to the missing pixel in the data stored in the data storage step; and wherein in the filter interpolation step, the values of the coefficients by which the pixel values of the neighboring pixels are multiplied are given by a product of $\{\sin(g \times d)\}/(g \times d)$ and a second prescribed constant, where d is the distance of the neighboring pixels from the missing pixel, and g is a first prescribed constant;

the coefficients are determined so that, except that the coefficient for the missing pixel is zero, the coefficients are proportional to coefficients used when the part of the filter interpolation step that performs the multiply-add operation is a low-pass filter, and the sum of the coefficients is 1;

when the reciprocal of the pixel pitch is represented by Fs, the cutoff spatial frequency is represented by Fc, and the value of the distance from each neighboring pixel to the pixel being processed, represented as a number of pixel pitches, is represented by s, the distance d is given by d=s/Fs, the first prescribed constant g is given by $g=2\pi \times Fc$, and the second constant KS0 is given by KS0=2Fc/Fs.

9. An image interpolation method for interpolating a missing pixel among a plurality of pixels arrayed in a line, wherein of the pixels aligned in the line, the pixels other than the missing pixel are mutually arrayed at a certain pitch, the pixels adjacent the missing pixel being mutually spaced apart by twice the certain pitch, the image interpolation device comprising:

a data storage step for storing data representing pixel values of the plurality of pixels other than the missing pixel;

a filter interpolation step for receiving data stored in the data storage step and performing a multiply-add operation by, from among the plurality of pixels arrayed in the line, multiplying the values of each of a plurality of neighboring pixels located in a neighborhood of the missing pixel by predetermined coefficients and adding resulting products, thereby calculating an interpolated value for the missing pixel;

a mean preserving interpolation step for receiving data stored in the data storage step and calculating an interpolated value for the missing pixel such that a mean value of the pixel values of the pixels in a row of pixels including the missing pixel in the plurality of pixels arrayed in the line and a mean value of the pixel values of the pixels in a row of pixels excluding the missing pixel in the plurality of pixels arrayed in the line become equal;

a selection control step for using each of a plurality of pixels having known pixel values and located in a vicinity of the missing pixel, in the plurality of pixels arrayed in the line, as a test interpolation pixel, determining, as interpolation differences, differences between the known value of the test interpolation pixel and test interpolation values calculated by the filter interpolation step and the mean preserving interpolation step by methods identical to methods used to determine the interpolated values for the missing pixel, and selecting the filter interpolation step or the mean preserving interpolation step, whichever has the minimum total interpolation difference value for the plurality of test interpolation pixels;

an output step for outputting the interpolated value calculated for the missing pixel by the filter interpolation step or the mean preserving interpolation step, as selected by the selection control step, as interpolation data for the missing pixel; and an interpolation data insertion step for inserting the interpolation data output from the output step into a position corresponding to the missing pixel in data stored in the data storage step; and wherein in the filter interpolation step, the values of the coefficients by which the pixel values of the neighboring pixels are multiplied are given by a product of $\{\sin(g \times d)\}/(g \times d)$ and a second prescribed constant, where d is the distance of the neighboring pixels from the missing pixel, and g is a first prescribed constant;

the coefficients are determined so that, except that the coefficient for the missing pixel is zero, the coefficients are proportional to coefficients used when the part of the filter interpolation step that performs the multiply-add operation is a low-pass filter, and the sum of the coefficients is 1;

when the reciprocal of the pixel pitch is represented by Fs, the cutoff spatial frequency is represented by Fc, and the value of the distance from each neighboring pixel to the pixel being processed, represented as a number of pixel pitches, is represented by s, the distance d is given by d=s/Fs, the first prescribed constant g is given by $g=2\pi \times Fc$, and the second constant KS0 is given by KS0=2Fc/Fs.

* * * * *